United States Patent
Kim et al.

(10) Patent No.: US 9,014,082 B2
(45) Date of Patent: Apr. 21, 2015

(54) METHOD AND DEVICE FOR SIGNAL TRANSMISSION ON A WIRELESS COMMUNICATIONS SYSTEM

(75) Inventors: Hak Seong Kim, Anyang-si (KR); Joon Kui Ahn, Anyang-si (KR); Han Byul Seo, Anyang-si (KR); Byoung Hoon Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 668 days.

(21) Appl. No.: 13/380,689

(22) PCT Filed: Jun. 25, 2010

(86) PCT No.: PCT/KR2010/004159
§ 371 (c)(1),
(2), (4) Date: Dec. 23, 2011

(87) PCT Pub. No.: WO2010/151086
PCT Pub. Date: Dec. 29, 2010

(65) Prior Publication Data
US 2012/0099519 A1    Apr. 26, 2012

Related U.S. Application Data

(60) Provisional application No. 61/220,546, filed on Jun. 25, 2009, provisional application No. 61/234,597, filed on Aug. 17, 2009, provisional application No. 61/234,618, filed on Aug. 17, 2009, provisional (Continued)

(30) Foreign Application Priority Data

Jun. 25, 2010 (KR) .................. 10-2010-0060531

(51) Int. Cl.
*H04B 7/14* (2006.01)
*H04W 72/04* (2009.01)
*H04L 5/00* (2006.01)

(52) U.S. Cl.
CPC ............. *H04W 72/0426* (2013.01); *H04L 5/00* (2013.01); *H04L 5/0007* (2013.01); *H04L 5/0044* (2013.01); *H04L 5/0053* (2013.01)

(58) Field of Classification Search
CPC .... H04L 5/00; H04L 5/0053; H04W 72/0426
USPC .......................................................... 370/315
See application file for complete search history.

(56) References Cited

U.S. PATENT DOCUMENTS

2005/0047335 A1* 3/2005 Cheng et al. .................. 370/229
2008/0070582 A1* 3/2008 Cai ................................ 455/450

(Continued)

OTHER PUBLICATIONS

"Relay Link Control Signalling," 3GPP TSG RAN WG1 Meeting # 56bis R1-091151, Research in Motion, UK Limited, Mar. 23 to 27, 2009, pp. 1 to 5.

(Continued)

*Primary Examiner* — Asad Nawaz
*Assistant Examiner* — Syed S Ali
(74) *Attorney, Agent, or Firm* — Birch, Stewart, Kolasch & Birch, LLP

(57) ABSTRACT

A method for signal transmission in a wireless communication system is provided. The method includes: transmitting backhaul resource allocation information by a base station to a relay node; decoding the backhaul resource allocation information by the relay node; and transmitting backhaul downlink control information and backhaul downlink data by the base station to the relay node, wherein a start position of a symbol for transmitting the backhaul downlink control information is fixed to a specific symbol of a backhaul link subframe, and the backhaul resource allocation information includes information on a radio resource for transmitting the backhaul downlink data.

8 Claims, 50 Drawing Sheets

Related U.S. Application Data application No. 61/235,374, filed on Aug. 20, 2009, provisional application No. 61/251,276, filed on Oct. 13, 2009, provisional application No. 61/265,746, filed on Dec. 1, 2009.

(56) References Cited

U.S. PATENT DOCUMENTS

| | | | |
|---|---|---|---|
| 2010/0080166 A1* | 4/2010 | Palanki et al. | 370/315 |
| 2010/0097978 A1* | 4/2010 | Palanki et al. | 370/315 |
| 2010/0120442 A1* | 5/2010 | Zhuang et al. | 455/450 |
| 2011/0128933 A1* | 6/2011 | Chen et al. | 370/330 |
| 2012/0087276 A1* | 4/2012 | Huang et al. | 370/253 |
| 2012/0127888 A1* | 5/2012 | Fujishima et al. | 370/252 |
| 2012/0147810 A1* | 6/2012 | Wang et al. | 370/315 |
| 2012/0201229 A1* | 8/2012 | Feng et al. | 370/336 |

OTHER PUBLICATIONS

"Resource Allocation and Downlink Control Channel Structure for Relay Backhaul Link," 3GPP TSG RAN WG1 Meeting #56bis R1-091194, LG Electronics, Mar. 23-27, 2009.

* cited by examiner

FIG. 21

METHOD AND DEVICE FOR SIGNAL TRANSMISSION ON A WIRELESS COMMUNICATIONS SYSTEM

CROSS REFERENCE TO RELATED APPLICATIONS

This application is the National Phase of PCT/KR2010/004159 filed on Jun. 25, 2010, which claims priority under 35 U.S.C. §119(e) to U.S. Provisional Application Nos. 61/220,546 filed on Jun. 25, 2009, 61/234,597 filed on Aug. 17, 2009, 61/234,618 filed on Aug. 17, 2009, 61/235,374 filed on Aug. 20, 2009, 61/251,276 filed on Oct. 13, 2009, and 61/265,746 filed on Dec, 1, 2009, and under 35 U.S.C. §119(a) to Patent Application No. 10-2010-0060531 filed in the Republic of Korea on Jun. 25, 2010, all of which are hereby expressly incorporated by reference into the present application.

TECHNICAL FIELD

The present invention relates to wireless communications, and more particularly, to a method and apparatus for signal transmission in a wireless communication system employing a relay node.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A technology related to a relay node is one of main technologies for the LTE-advanced.

A relay node (RN) is a device for relaying a signal between a base station (BS) and a user equipment (UE), and is used for cell coverage extension and throughput enhancement of a wireless communication system.

Many researches for a method of transmitting a signal between the BS and the RN are currently ongoing in the wireless communication employing the RN. A conventional method of transmitting a signal between the BS and the UE has a problem when a signal is transmitted between the BS and the RN.

For example, when using frequency division duplex (FDD) between a BS and a UE, a frequency band in which the BS transmits a downlink signal is distinguished from a frequency band in which the UE transmits an uplink signal. That is, since signals are transmitted/received between the BS and the UE at different frequency bands, there is no problem when transmitting/receiving signals simultaneously.

On the other hand, a frequency band in which the RN transmits an access downlink signal to a relay node-UE (RN-UE) may be identical to a frequency band in which the BS transmits a backhaul downlink signal to the RN. In addition, a frequency band in which the RN-UE transmits an access uplink signal to the RN may be identical to a frequency band in which the RN transmits a backhaul uplink signal to the BS. That is, when the wireless communication system employs the RN, the RN may have to receive or transmit signals at the same frequency band. It is assumed in this case that, it is difficult to transmit and receive signals simultaneously at the same frequency band due to self-interference. Therefore, the BS transmits/receives signals to/from the BS and the RN-UE by using time division multiplexing (TDM).

In addition, the RN may have to receive a signal from the BS after transmitting a control signal to the RN-UE linked to the RN in a subframe in which a signal is received from the BS. Therefore, a specific transient time or guard time may be necessary due to transmission/reception switching of a signal in a subframe.

Accordingly, there is a need for a method and apparatus for transmitting a control signal and data between a BS and an RN by considering an operational characteristic of the RN.

SUMMARY OF INVENTION

Technical Problem

The present invention provides a method and apparatus for signal transmission between a base station and a relay node in a wireless communication system employing the relay node.

Technical Solution

According to an aspect of the present invention, a method for signal transmission in a wireless communication system is provided. The method includes: transmitting backhaul resource allocation information by a base station to a relay node; decoding the backhaul resource allocation information by the relay node; and transmitting backhaul downlink control information and backhaul downlink data by the base station to the relay node, wherein a start position of a symbol for transmitting the backhaul downlink control information is fixed to a specific symbol of a backhaul link subframe, and the backhaul resource allocation information includes information on a radio resource for transmitting the backhaul downlink data.

According to another aspect of the present invention, a relay node is provided. The relay node includes: a radio frequency (RF) unit for transmitting and receiving a radio signal; and a processor coupled to the RF unit, wherein the processor receives backhaul resource allocation information from a base station, decodes the backhaul resource allocation information, and receives backhaul downlink control information and backhaul downlink data from the base station, wherein a start position of a symbol for transmitting the backhaul downlink control information is fixed to a specific symbol of a backhaul link subframe, and the backhaul resource allocation information includes information on a radio resource for transmitting the backhaul downlink data.

Advantageous Effects

According to the present invention, a resource to which a control signal transmitted by a base station to a relay node is allocated has a fixed position, and thus the control signal can be decoded in the relay node with less complexity. In addition, resources can be used more efficiently in a backhaul link.

DESCRIPTION OF DRAWINGS

FIG. 21 shows an example of an indexing method of symbols used for R-PDSCH transmission when a resource region in which an R-PDCCH is located in a frequency band allocated to a relay node coexist with a resource region in which the R-PDCCH is not located.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the 3GPP LTE/LTE-A. However, technical features of the present invention are not limited thereto.

Figure 1:
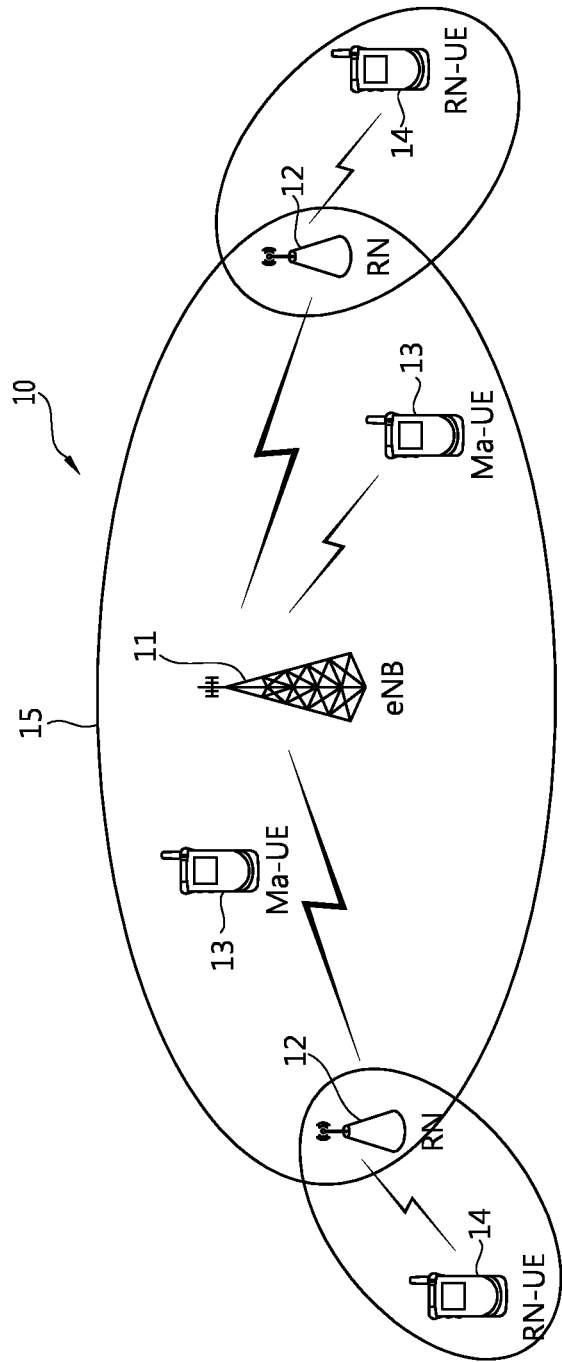
FIG. 1 shows a wireless communication system employing a relay node.

FIG. 1 shows a wireless communication system employing a relay node (RN).

Referring to FIG. 1, a wireless communication system 10 employing an RN includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RN 12 and a UE 14, management, control, resource allocation, etc.

The RN 12 is a device for relaying a signal between the BS 11 and the UE 14, and is also referred to as another terminology such as a relay station (RS), a repeater, a relay, etc. A relay scheme used in the RN may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma-UE) 13 denotes a UE that directly communicates with the BS 11, and a relay node-UE (RN-UE) 14 denotes a UE that communicates with the RN. Even if the Ma-UE 13 exists in a cell of the BS 11, the Ma-UE 13 can communicate with the BS 11 via the RN 12 to improve a data transfer rate depending on a diversity effect.

Hereinafter, a link between the BS 11 and the Ma-UE 13 is referred to as a macro link. The macro link can be divided into a macro downlink (M-DL) and a macro uplink (M-UL). The M-DL denotes communication from the BS 11 to the Ma-UE 13. The M-UL denotes communication from the Ma-UE 13 to the BS 11.

A link between the BS 11 and the RN 12 is referred to as a backhaul link. The backhaul link can be divided into a backhaul downlink (B-DL) and a backhaul uplink (B-UL). The B-DL denotes communication from the BS 11 to the RN 12. The B-UL denotes communication from the RN 12 to the BS 11.

A link between the RN 12 and the RN-UE 14 is referred to as an access link. The access link can be divided into an access downlink (A-DL) and an access uplink (A-UL). The A-DL denotes communication from the RN 12 to the RN-UE 14. The A-UL denotes communication from the RN-UE 14 to the RN 12.

The wireless communication system 10 employing the RN is a system supporting bidirectional communication. The bidirectional communication may be performed by using a time division duplex (TDD) mode, a frequency division duplex (FDD) mode, etc. When in the TDD mode, different time resources are used in UL transmission and DL transmission. When in the FDD mode, different frequency resources are used in UL transmission and DL transmission.

Figure 2:
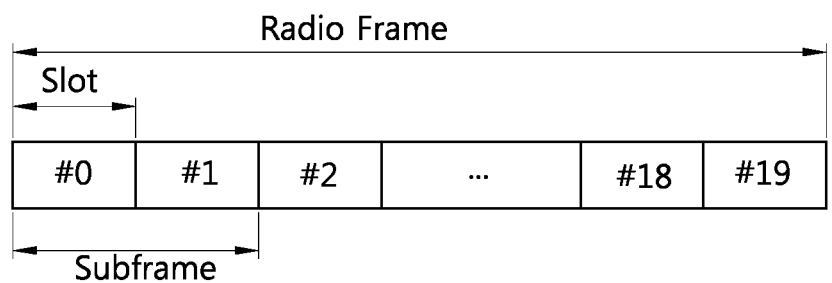
FIG. 2 shows a radio frame structure of 3$^{rd}$ generation partnership project (3GPP) long term evolution (LTE).

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol period, and can be referred to as other terms. For example, the OFDM symbol can also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 2.

Figure 3:
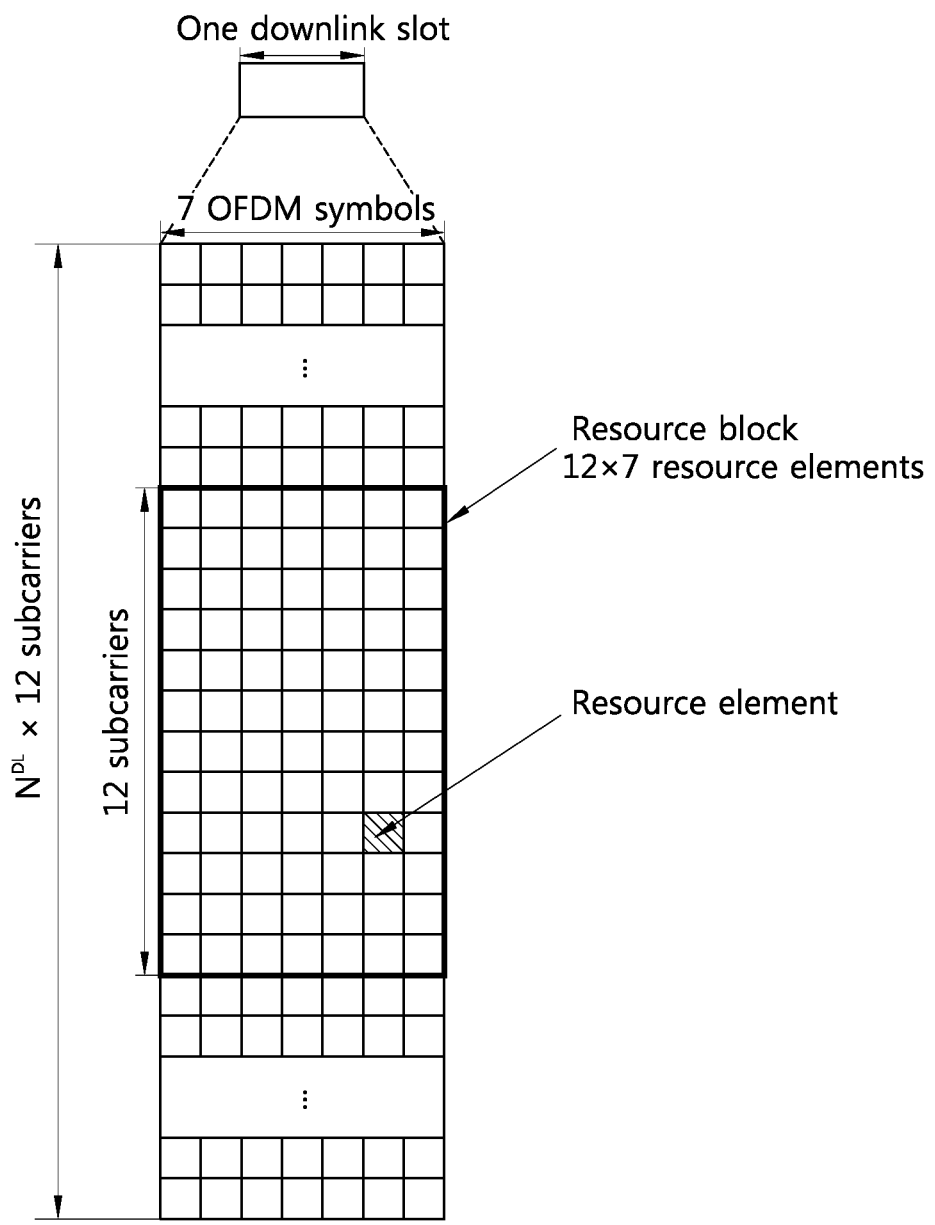
FIG. 3 shows an example of a resource grid for one downlink slot.

FIG. 3 shows an example of a resource grid for one DL slot.

In FDD and TDD radio frames, one slot includes a plurality of OFDM symbols in a time domain and a plurality of resource blocks (RBs) in a frequency domain. Hereinafter, a symbol may imply one OFDM symbol or one SC-FDMA symbol. The RB is a resource allocation unit, and includes a plurality of consecutive subcarriers in one slot.

Referring to FIG. 3, a slot (e.g., a DL slot included in a DL subframe) includes a plurality of OFDM symbols in the time domain. Although it is described herein that one DL slot includes 7 OFDM symbols and one RB includes 12 subcarriers in the frequency domain, this is for exemplary purposes only, and thus the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the DL slot depends on a DL transmission bandwidth determined in a cell. The resource grid described in FIG. 3 can also apply to UL transmission.

Figure 4:
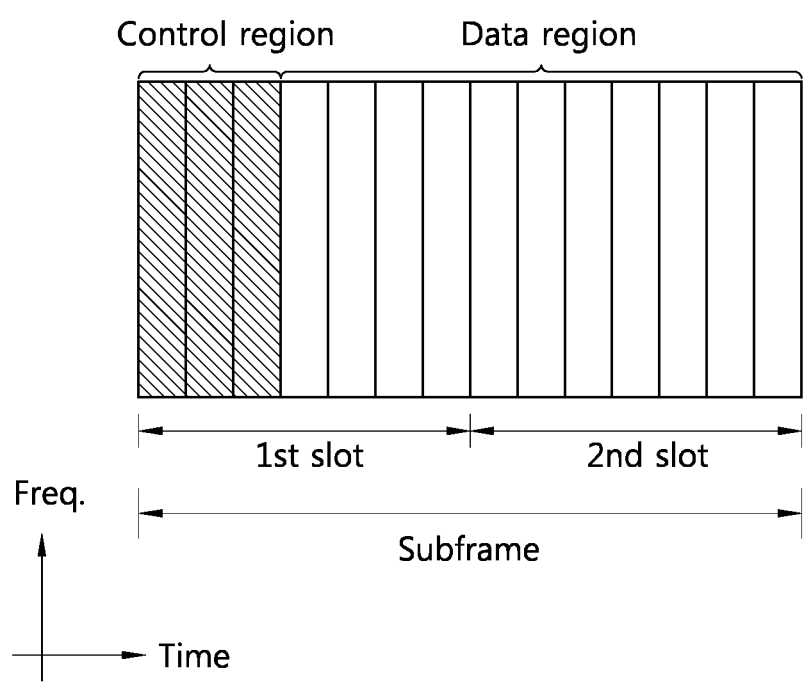
FIG. 4 shows a structure of a downlink subframe between a base station and a user equipment.

FIG. 4 shows a structure of a DL subframe between a BS and a UE.

Referring to FIG. 4, the subframe includes two consecutive slots. A maximum of three OFDM symbols located in a front portion of a $1^{st}$ slot within the subframe correspond to a control region to which a physical downlink control channel (PDCCH) is allocated. The remaining OFDM symbols correspond to a data region to which a physical downlink shared channel (PDSCH) is allocated. In addition to the PDCCH, control channels such as a physical control format indicator channel (PCFICH), a physical hybrid automatic repeat request (HARQ) indicator channel (PHICH), etc., can be allocated to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region The number of OFDM symbols included in the control region of the subframe can be known by using the PCFICH.

The control region consists of a plurality of control channel elements (CCEs) as a logical CCE stream. Hereinafter, the CCE stream denotes a set of all CCEs constituting the control region in one subframe. The CCE corresponds to a plurality of resource element groups (REGs). For example, the CCE may correspond to 9 REGs. The REG is used to define mapping of a control channel onto a resource element. For example, one REG may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. The number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be an element of $\{1, 2, 4, 8\}$.

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 5:
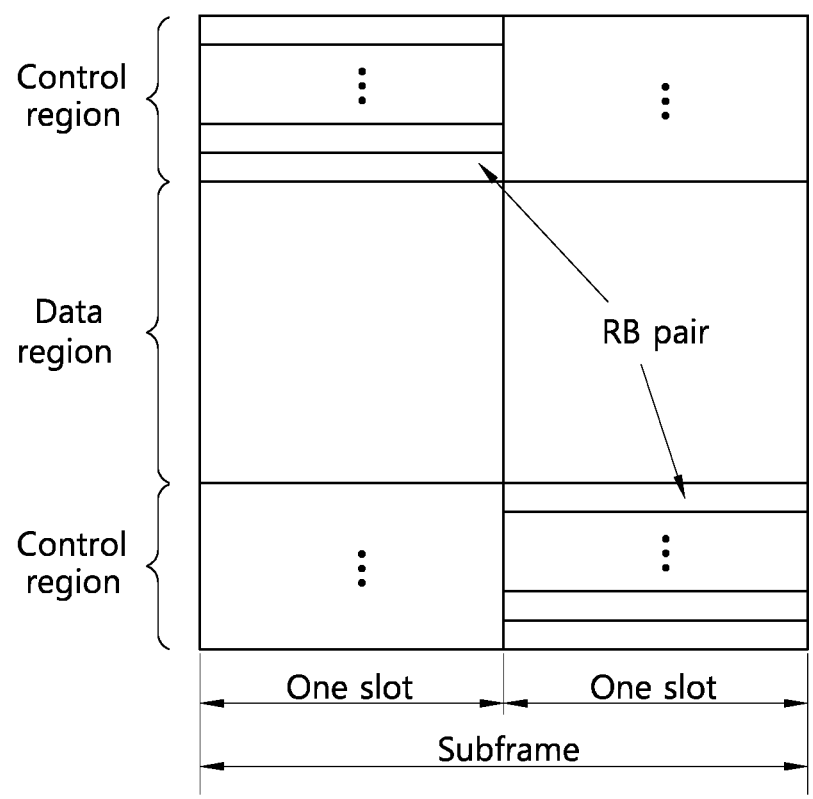
FIG. 5 shows a structure of an uplink subframe between a base station and a user equipment.

FIG. 5 shows a structure of a UL subframe between a BS and a UE.

Referring to FIG. 5, the UL subframe can be divided into a control region and a data region. The control region is a region to which a physical uplink control channel (PUCCH) for carrying UL control information is allocated. The data region is a region to which a physical uplink shared channel (PUSCH) for carrying user data is allocated.

The PUCCH for one UE is allocated in a pair of RBs 51 and 52. The RBs 51 and 52 belonging to the RB pair occupy different subcarriers in each of two slots. This is called that the RB pair allocated to the PUCCH is frequency-hopped in a slot boundary.

The PUCCH can support multiple formats. That is, UL control information having a different number of bits for each subframe can be transmitted according to a modulation scheme. For example, when using a binary phase shift keying (BPSK) (i.e., a PUCCH format 1a), 1-bit UL control information can be transmitted on the PUCCH, and when using quadrature phase shift keying (QPSK) (i.e., a PUCCH format 1b), 2-bit UL control information can be transmitted on the PUCCH. In addition thereto, examples of the PUCCH format include a format 1, a format 2, a format 2a, a format 2b, etc. For this, the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

Figure 6:
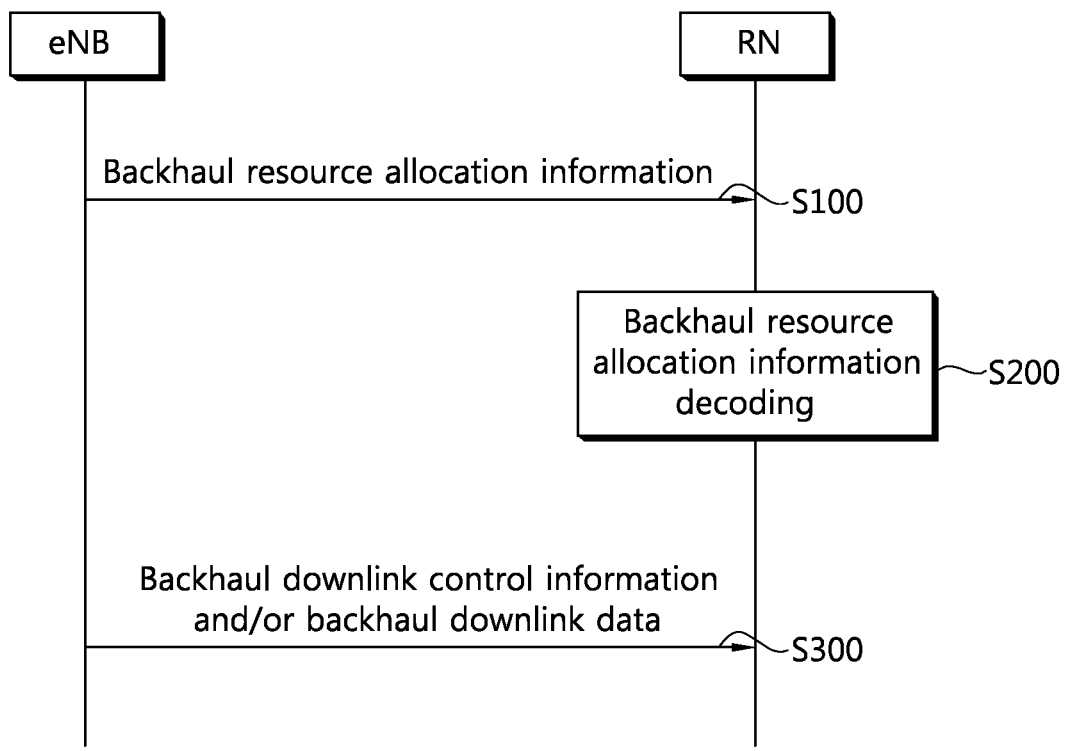
FIG. 6 shows a backhaul downlink signal transmission method according to an embodiment of the present invention.

FIG. 6 shows a B-DL signal transmission method according to an embodiment of the present invention.

A BS transmits backhaul resource allocation information to an RN (step S100). The backhaul resource allocation information may include information on a resource for transmitting B-DL data and/or information on a resource for transmitting B-DL control information. The backhaul resource allocation information may be transmitted through a higher layer signal (e.g., radio resource control (RRC)) or a physical layer signal.

The RN decodes the backhaul resource allocation information (step S200). By decoding the backhaul resource allocation information, the RN can know a radio resource for transmitting B-DL data. In addition, when a radio resource for transmitting B-DL control information is determined semi-statically, a radio resource for transmitting the B-DL control information can be known by using the backhaul resource allocation information.

The BS transmits B-DL control information and/or B-DL data (step S300). In this case, the B-DL data can be transmitted by using a radio resource indicated by the backhaul resource allocation information. Alternatively, the B-DL data can be transmitted by using a radio resource indicated by the B-DL control information.

The aforementioned method according to the present invention will be described hereinafter in detail. Terminologies will be first defined for convenience of explanation. Hereinafter, an R-PDCCH denotes a control channel on which the BS transmits B-DL control information to the RN. An R-PDSCH denotes a data channel in which the BS transmits B-DL data to the RN. The B-DL signal is a signal transmitted by the BS to the RN. For example, the B-DL signal may include B-DL control information and/or B-DL data. A macro PDCCH denotes a control channel in which the BS transmits DL control information to a Ma-UE. An access PDCCH denotes a control channel in which the RN transmits A-DL control information to the RN-UE. An R-PDCCH region denotes a radio resource region in which the R-PDCCH is transmitted. Likewise, an R-PDSCH region denotes a radio resource region in which the R-PDSCH is transmitted.

A start position of the R-PDCCH region has been conventionally determined in a variable manner according to the number of symbols of the macro PDCCH in which the BS transmits a control signal to the Ma-UE and the number of symbols of the access PDCCH in which the RN transmits a control signal to the RN-UE.

For example, the R-PDCCH region starts from a symbol located next to a symbol in which the macro PDCCH is transmitted. The number of symbols of the macro PDCCH is delivered through a PCFICH, and may have a value of 1, 2, 3, or 4. Therefore, the R-PDCCH region may have a different start symbol position depending on the number of symbols indicated by the PCFICH. That is, the R-PDCCH region has conventionally started from a first symbol of a resource region in which the RN can receive a signal from the BS. The conventional method has a problem in that complexity increases when the RN performs R-PDCCH decoding. In addition, there is also a problem of resource utilization for a symbol located ahead of a symbol in which the R-PDCCH region starts in a frequency band allocated to the RN. The present invention can solve these problems.

Figure 7:
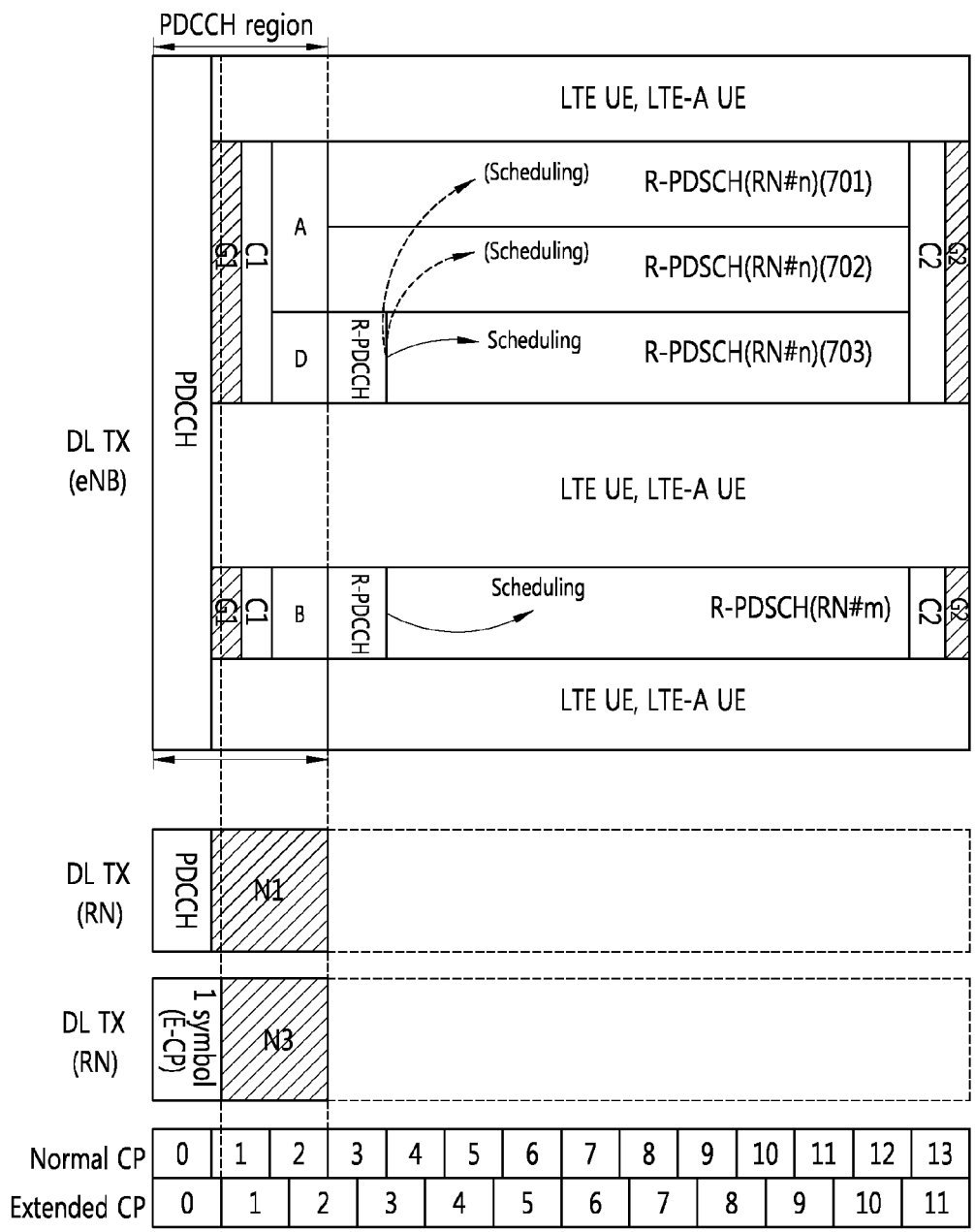
FIG. 7 shows an example of a multiplexing method in a subframe in which a base station transmits a backhaul downlink signal to a relay node.

FIG. 7 shows an example of a multiplexing method in a subframe in which a BS transmits a B-DL signal to an RN.

The BS can report to the RN about multiplexing of a subframe by using backhaul resource allocation information. In FIG. 7, a guard time is denoted by G1 and G2, each of which may be a time period less than one symbol. For example, G1 and G2 each may be a ½-symbol period, but the present invention is not limited thereto. In addition, G1 and G2 may be either identical or different time periods. Although G1 and G2 are both shown in FIG. 7, this is for exemplary purposes only, and thus only one of them may be included. In FIG. 7, a time period other than the guard time in one symbol period is denoted by C1 and C2. When C1 and C2 are combined, it may be a time period greater than one symbol period.

Referring to FIG. 7, the R-PDCCH region may have a fixed start position in a time domain. That is, irrespective of the number of symbols of the macro PDCCH and the number of symbols of the access PDCCH, a sampling time or a symbol in which the RN can receive a B-DL control signal always from the BS can be determined as the start position of the R-PDCCH region. For example, the R-PDCCH region may start from a $3^{rd}$, $4^{th}$, or $5^{th}$ symbol of a subframe. In the example of FIG. 7, the R-PDCCH region starts from the $4^{th}$ symbol (i.e., a symbol index #3).

Although an example in which the R-PDCCH region includes one symbol is shown in FIG. 7, a time length of the R-PDCCH region can change variously depending on an amount (i.e., the number of bits) of B-DL control information. That is, the R-PDCCH region may include one or a plurality of symbols in a time domain, and may be configured across one resource block or a plurality of resource blocks in a frequency domain.

Alternatively, the start position of the R-PDCCH region may change semi-statically. That is, as long as a modification signal is not additionally given, the start position of the R-PDCCH region is fixed, and when the modification signal is given by a higher layer signal, the start position may change. For example, the start position of the R-PDCCH region may be any one symbol among $1^{st}$ to $5^{th}$ symbols of a subframe. Since the start position of the R-PDCCH region is fixed or changes semi-statically in the time domain in the present invention, complexity decreases when the RN performs R-PDCCH decoding.

The BS can transmit B-DL control information to the RN through the R-PDCCH. The B-DL control information may include resource allocation information on the R-PDSCH allocated to the RN. The resource allocation information on the R-PDSCH may indicate only a resource allocation limited to a frequency band in which the R-PDCCH is transmitted (see RN#m), and may indicate other resource allocations by including a resource allocation for a frequency band other than the frequency band in which the R-PDCCH is transmitted (see RN#n). That is, in case of RN#n, the R-PDCCH is transmitted only in some of frequency bands allocated to the RN#n, and only the R-PDSCH is transmitted in the remaining frequency bands. The R-PDSCH region can be indicated by the R-PDCCH as described above.

Alternatively, the BS can report to the RN the R-PDSCH region by using backhaul resource allocation information delivered using the higher layer signal such as an RRC message. Examples of information that can be included in the higher layer signal may include information on a position at which the R-PDSCH region starts, information on a duration (or length) of the R-PDSCH region (e.g., the number of sampling times or the number of symbols included in the R-PDSCH region, etc.), and information on the frequency band.

The R-PDSCH region indicted by the R-PDCCH or the higher layer signal may have a different start position according to whether it is a frequency band in which the R-PDCCH is transmitted or whether it is a frequency band in which the R-PDCCH is not transmitted. For example, in backhaul signal transmission, the BS may not use a backhaul transmission-permitted resource region (e.g., a region B or a region D) located ahead of the R-PDCCH region in the frequency band in which the R-PDCCH is transmitted. In this case, the RN may perform decoding only on a symbol located next to the R-PDCCH region in the frequency band in which the R-PDCCH is transmitted, and may also perform decoding on a symbol located ahead of the R-PDCCH region in case of a frequency band in which the R-PDCCH is not transmitted. For example, regions indicated by A, B, and D in FIG. 7 are backhaul transmission-permitted resource regions which are temporally prior to the R-PDCCH region. The regions A and the R-PDCCH regions 701, 702, and 703 can be used by the BS when performing R-PDSCH transmission. The region A can also be used for PDSCH transmission in which the BS transmits data to the Ma-UE. On the other hand, the regions B and D may not be used when performing R-PDSCH transmission.

The method described with reference to FIG. 7 may also equally apply to various timing relations with respect to a backhaul link and a macro link.

Figure 8:
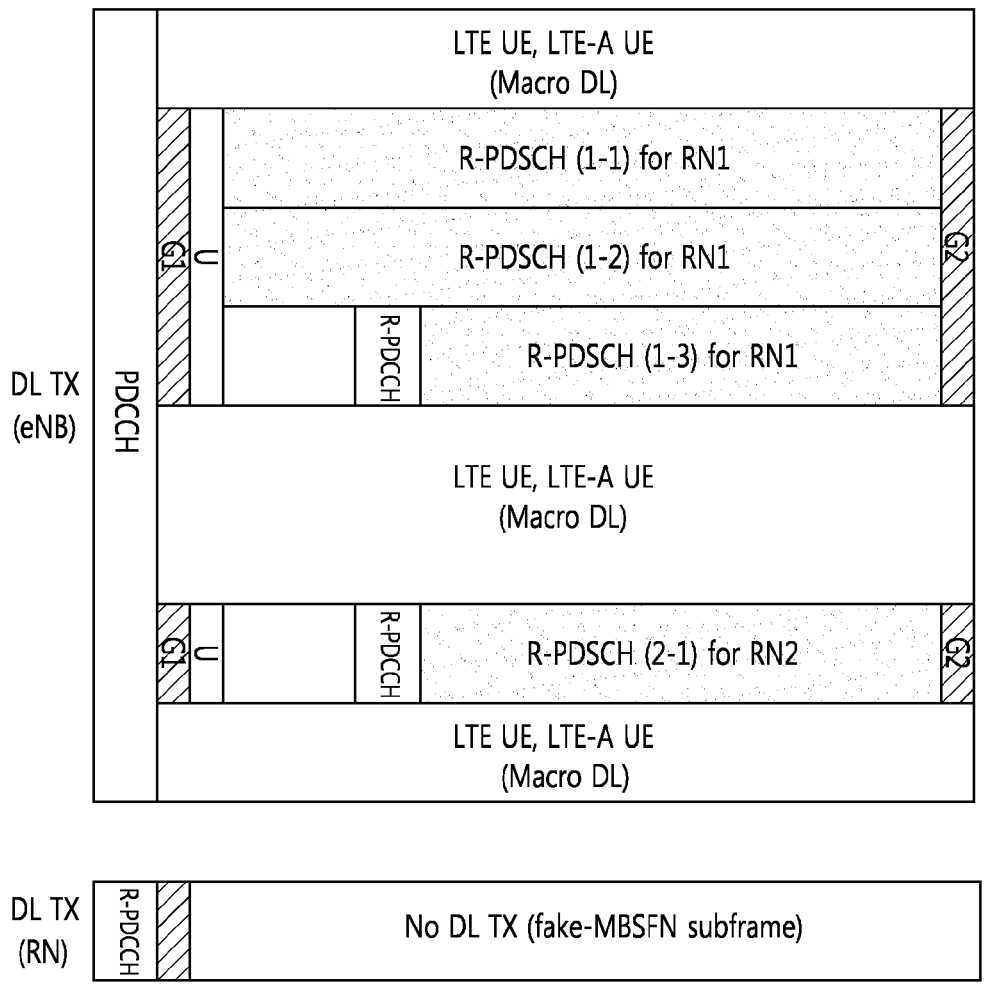
FIG. 8 to FIG. 10 show examples of a multiplexing method based on a timing relation with respect to a backhaul link and a macro link.
Figure 9:
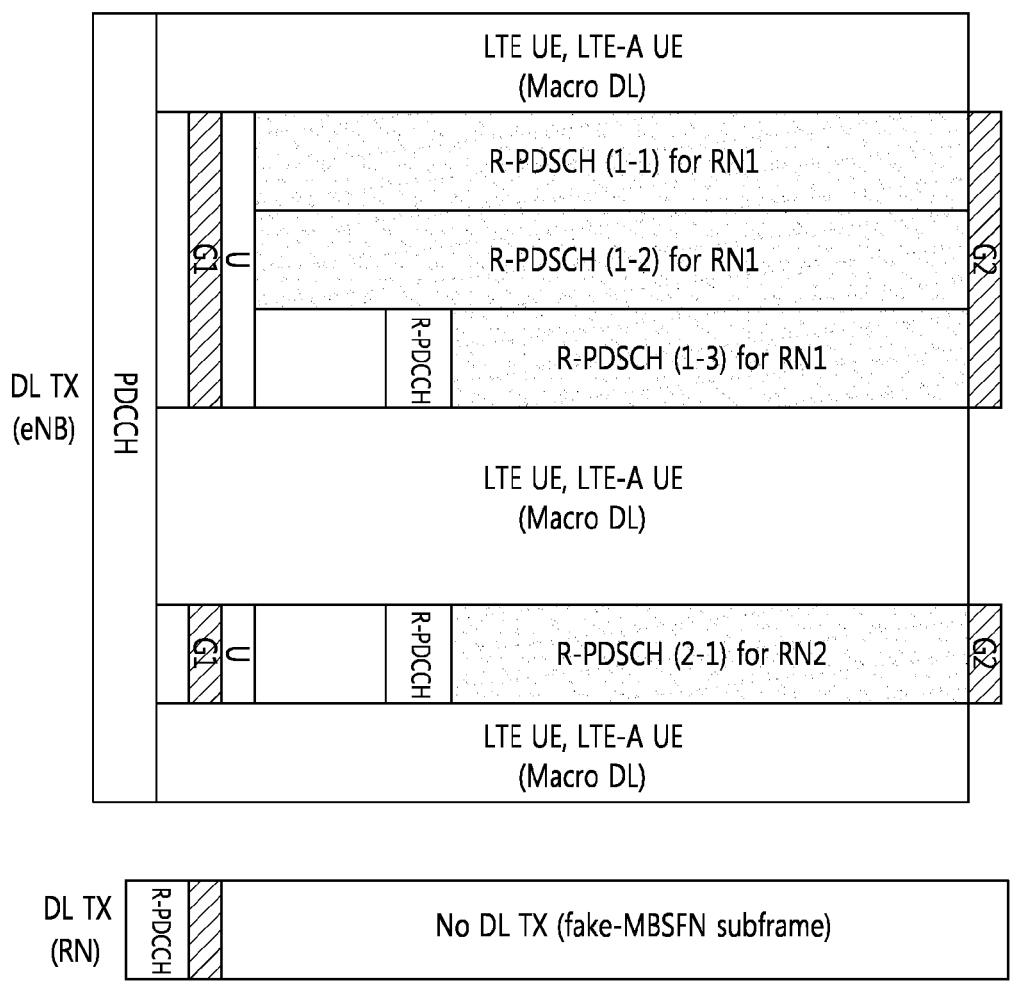
Figure 10:
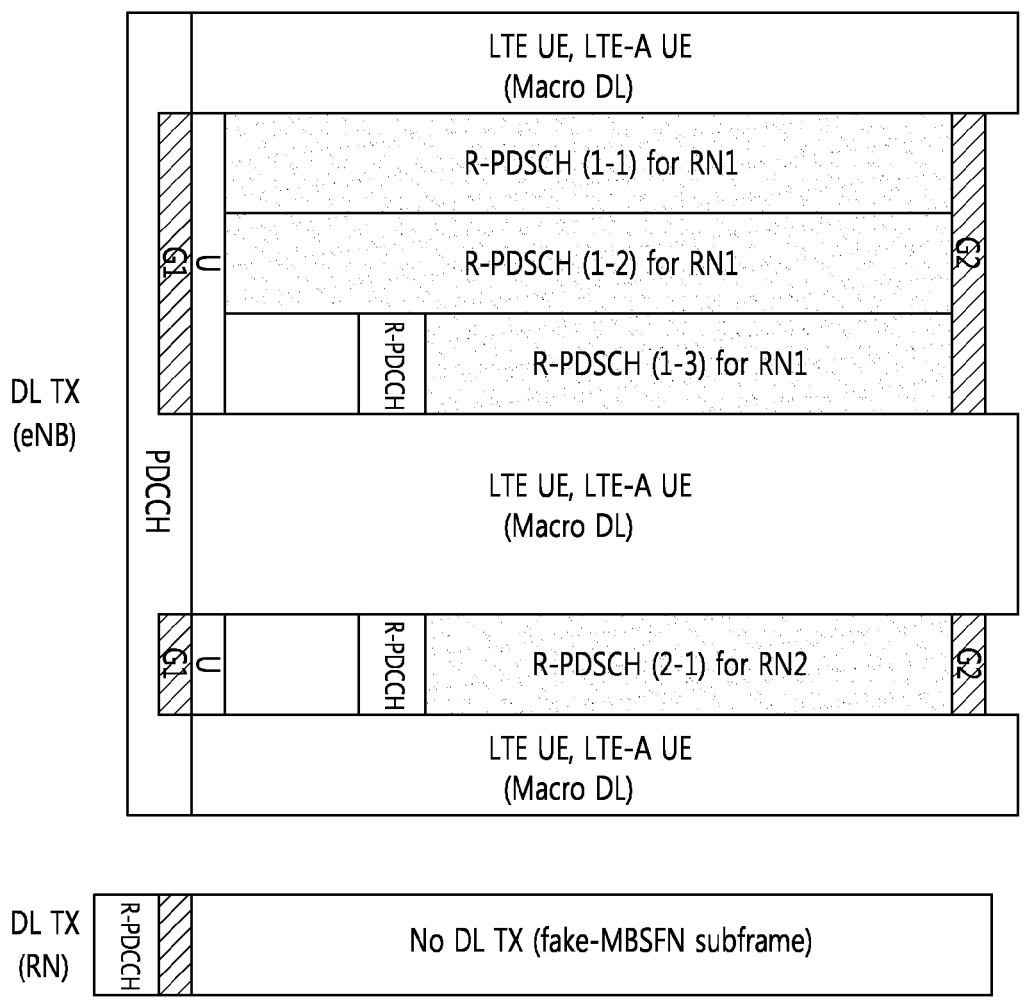

FIG. 8 to FIG. 10 show examples of a multiplexing method based on a timing relation with respect to a backhaul link and a macro link.

FIG. 8 shows an example in which subframe boundaries are matched between a subframe of the backhaul link and a subframe of the macro link. FIG. 9 shows an example in which timing of a subframe of the backhaul link is delayed in comparison with a subframe of the macro link (e.g., an example in which timing is delayed by a guard time) in the backhaul and the macro link. FIG. 10 shows an example in which timing of a subframe of the backhaul link is advanced in comparison with a subframe of the macro link (e.g., an example in which timing is advanced by a guard time) in the backhaul link and the macro link.

In FIG. 8 to FIG. 10, an R-PDSCH region may have a different start position according to a frequency band. For example, a plurality of frequency bands may be allocated to the same RN (e.g., RN1). In this case, the R-PDCCH may be included in any one frequency band, and may not be included in the remaining frequency bands (because the R-PDCCH included in any one frequency band can perform scheduling on the remaining frequency bands). In the frequency band including the R-PDCCH region, an R-PDSCH region (i.e., R-PDSCH(1-3)) may start from a symbol located next to the R-PDCCH region. In the frequency band not including the R-PDCCH, R-PDSCH regions (i.e., R-PDSCH(1-1) and R-PDSCH(1-2)) may start from a symbol located ahead of the frequency band including the R-PDCCH. In this case, a specific symbol from which the R-PDSCH region can start may differ depending on the number of symbols of a macro PDCCH and the number of symbols of an access PDCCH. For example, if the number of symbols of the macro PDCCH and the number of symbols of the PDCCH is 1 and the R-PDCCH is located at a $4^{th}$ symbol (i.e., symbol index #3), the R-PDSCH may start from a $5^{th}$ symbol (i.e., symbol index #4) in the frequency band including the R-PDCCH and may start from a $3^{rd}$ symbol (i.e., symbol index #2) in the frequency band not including the R-PDCCH.

The present invention can also apply to carrier aggregation (CA). For example, when the BS transmits a signal to the RN by using three DL carriers (i.e., DL carriers #1, #2, and #3), the DL carrier #1 may include the R-PDCCH and the remaining two DL carriers #2 and #3 may not include the R-PDCCH. In this case, the R-PDCCH of the DL carrier #1 may include backhaul resource allocation information on the DL carriers #1, #2, and #3. In addition, the R-PDSCH of the DL carrier #1 may start from a very next symbol of the R-PDCCH region, and the R-PDSCH of the DL carriers #2 and #3 may start from a previous symbol of the R-PDSCH of the DL carrier #1.

As shown in FIG. 8 to FIG. 10, when timing is mismatched between the subframe of the backhaul link and the subframe the macro link, a radio resource region allocated to the RN can be determined according to various methods as follows.

1. Regarding a frequency band not including an R-PDCCH among frequency bands allocated to the RN, a backhaul transmission-permitted region (hereinafter, referred to as a region A) including a symbol located ahead of an R-PDCCH region can also be used as an R-PDSCH (herein, the backhaul transmission-permitted region implies a region other than a symbol allocated to a macro PDCCH and a symbol including a guard time among symbols located ahead of a symbol to which the R-PDCCH is allocated in a subframe). In a frequency band including the R-PDCCH, a backhaul transmission-permitted region (hereinafter, referred to as a region B) including a symbol located ahead of an R-PDCCH region may be, or may be not, used as the R-PDSCH. In a symbol including a guard time, a symbol period other than the guard time (see regions C1 and C2 in FIG. 7, hereinafter, referred to as a region C) may be used as a PDSCH.

2. The region A and/or the region B and/or the region C may be used as the R-PDSCH.

3. The region A may be used as the R-PDSCH, and the region B may not be used, or may be used for other purposes.

4. The region A and/or the region B and/or a region C1 may be used as the R-PDSCH. A region C2 may be used for other purposes (see FIG. 7).

5. A frequency band of the R-PDCCH may be equal to a frequency band of the R-PDSCH.

6. The number of symbols of the R-PDCCH may be greater than or equal to 2. In this case, a symbol included in a first slot may be used for transmission of a B-DL grant, and a symbol included in a second slot may be used for transmission of a B-UL grant.

7. The region A and/or the region B may be used in a macro link or may be used for the R-PDSCH in a backhaul link.

9. The region B may be used for the R-PDSCH, and the region A may be used for the macro link 10. The region B may be used for the R-PDSCH, and the region A and/or the region C may be used for the macro link.

Figure 11:
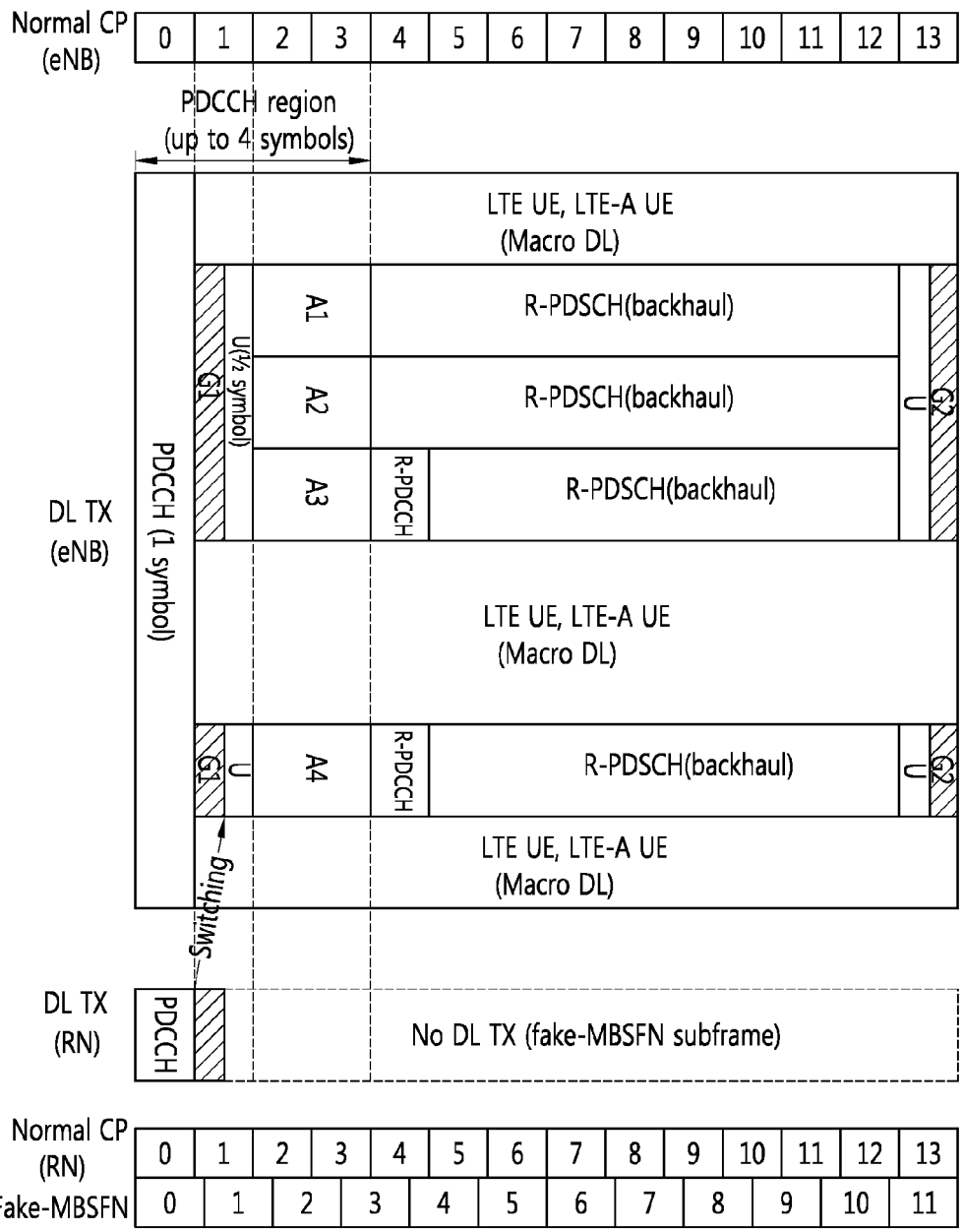
FIG. 11 shows an example of a multiplexing method of a backhaul link subframe in a normal cyclic prefix (CP)
Figure 12:
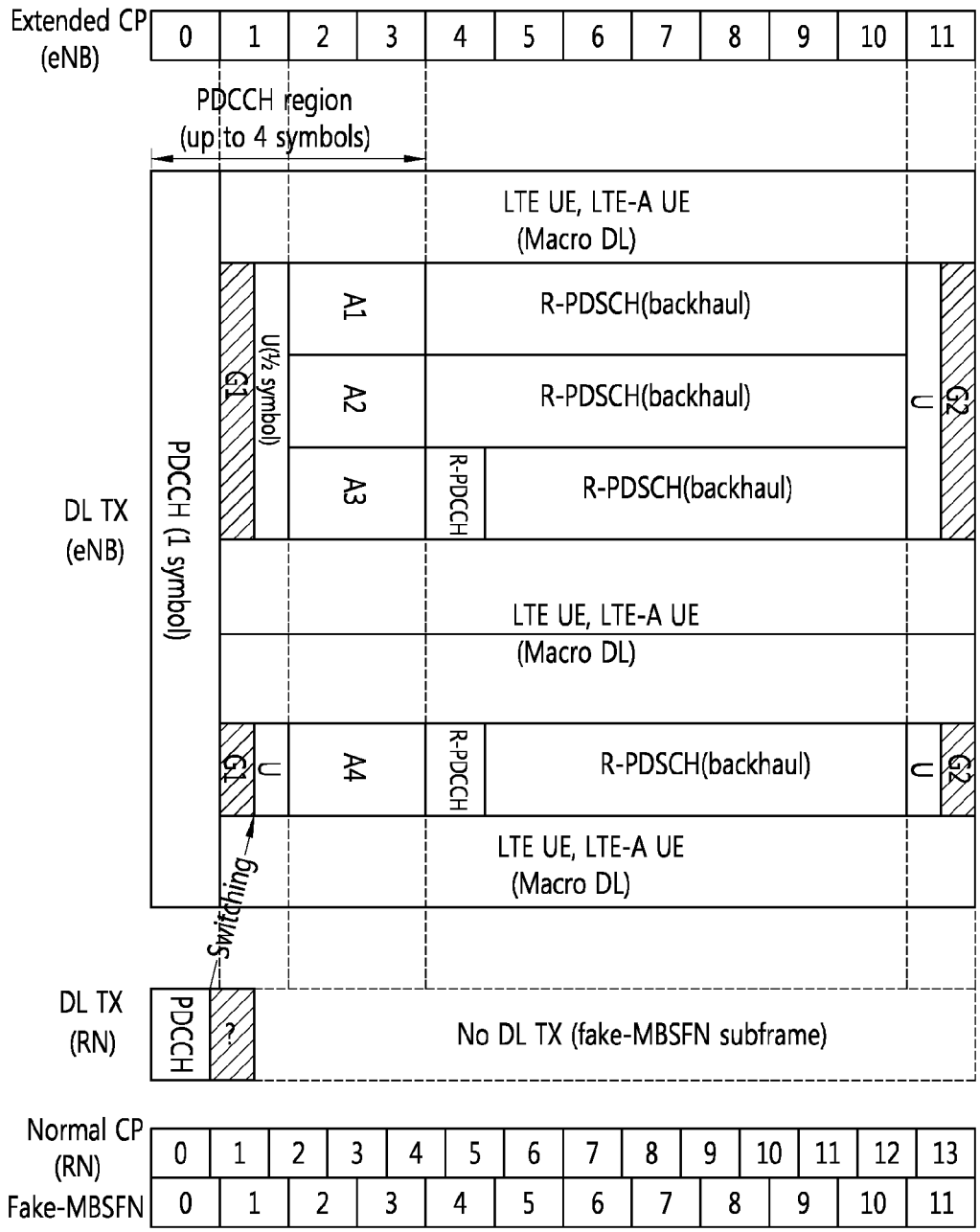
FIG. 12 shows an example of a multiplexing method of a backhaul link subframe in an extended CP.

FIG. 11 shows an example of a multiplexing method of a backhaul link subframe in a normal CP. FIG. 12 shows an example of a multiplexing method of a backhaul link subframe in an extended CP.

When the number of symbols in which an RN transmits an access PDCCH to an RN-UE is fixed to a specific number (e.g., one or two symbols), a BS can change the number of symbols (e.g., any one of 1, 2, 3, and 4 symbols) for transmitting a macro PDCCH dynamically or semi-statically. For example, if the BS can know the number of symbols of the access PDCCH by exchanging a control signal with the RN, the BS can dynamically change the number of symbols of the macro PDCCH. In this case, if the R-PDCCH region is allocated by being fixed to a specific symbol (e.g., a $5^{th}$ symbol in FIG. 11 and FIG. 12 or a $4^{th}$ symbol in FIG. 7) or changes semi-statically, a resource region located ahead of the R-PD- CCH region is generated. For example, resource regions indicated by A3, A4, and U in FIG. 11 and FIG. 12 are generated. By using a higher layer signal or a physical layer signal, the BS can transmit information indicating whether such a resource region is used. Alternatively, by using the higher layer signal or the physical layer signal, the BS can report information indicating whether each of regions indicated by A1, A2, A3, and A4 are collectively used or not. Alternatively, the BS can perform transmission by additionally including information indicating whether the region U and the region A4 are simultaneously used or whether only any one region is used (e.g., such as whether only the U region is used or whether only the region A4 is used). Herein, the same also applies to the region U and the region A3.

For this, the BS can report information on a start position of the R-PDSCH or a length of the R-PDSCH to the RN. Such information can be transmitted by being included in B-DL control information through the R-PDCCH, or can be transmitted by being included in backhaul resource allocation information which is a higher layer signal. For example, a field indicating the start position of the R-PDSCH and/or the length of the R-PDSCH can be defined in the B-DL control information of the R-PDCCH or the backhaul resource allocation information which is a higher layer signal. For convenience, such a field is referred to as an R-PDSCH allocation information field. The R-PDSCH allocation information field can be given by the start position of the R-PDSCH, the length of the R-PDSCH, or a combination of the two.

Figure 13:
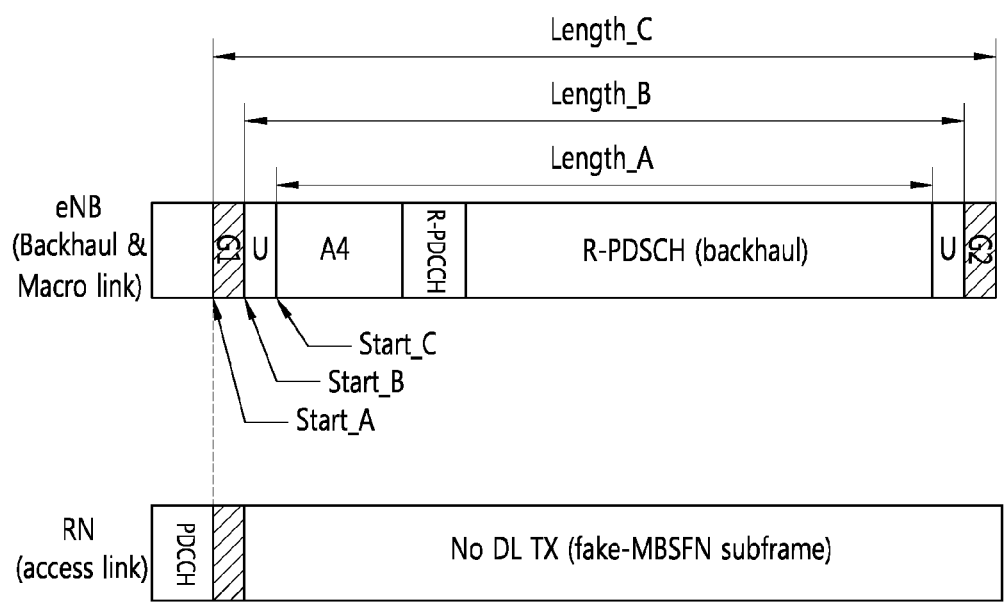
FIG. 13 and FIG. 14 show examples of an R-PDSCH's start position or length that can be indicated by an R-PDSCH allocation information field.
Figure 14:
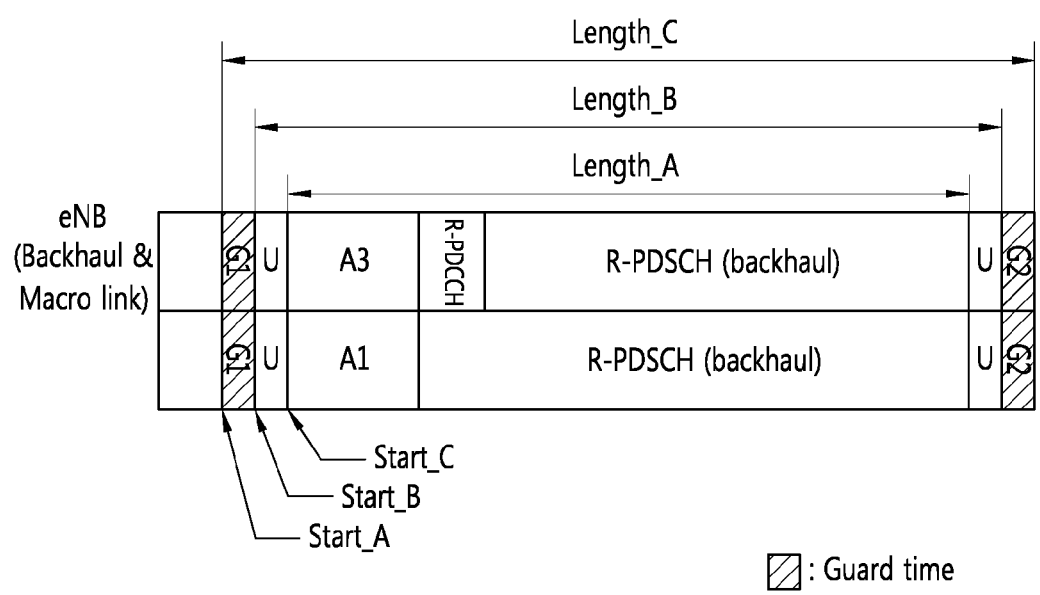

FIG. 13 and FIG. 14 show examples of an R-PDSCH's start position or length that can be indicated by an R-PDSCH allocation information field.

When the R-PDSCH allocation information field informs the start position of the R-PDSCH, the R-PDSCH allocation information field can indicate a first symbol located next to a symbol in which a macro PDCCH is transmitted (start_A), can indicate a position located next to the symbol in which the macro PDCCH is transmitted and a guard time (start_B), and can indicate a symbol located next to the symbol in which the macro PDCCH is transmitted and a symbol including the guard time (start_C).

When the R-PDSCH allocation information field informs the length of the R-PDSCH, as shown in FIG. 13 and FIG. 14, it may indicate a length of a duration other than the symbol in which the macro PDCCH is transmitted and the guard time in a subframe (Length_A), can indicate a length of a duration other than the symbol in which the macro PDCCH is transmitted and the guard time in the subframe (Length_B), and can indicate a length of a duration other than the symbol in which the macro PDCCH is transmitted in the subframe (Length_C). The start position and length of the R-PDSCH are for exemplary purposes only, and thus the present invention is not limited thereto.

In general, symbols are indexed in an ascending order from 0 to 13 (in case of a normal CP) in the subframe according to a time order. However, since the R-PDCCH can be allocated to a fixed symbol or can be determined semi-statically in the frequency band allocated to the RN, the symbol index can be defined differently for convenience of R-PDSCH decoding of the RN. It can be regarded that the symbol index of the R-PDSCH indicates a decoding order of the RN, and can apply to physical resource mapping and data decoding.

Figure 15:
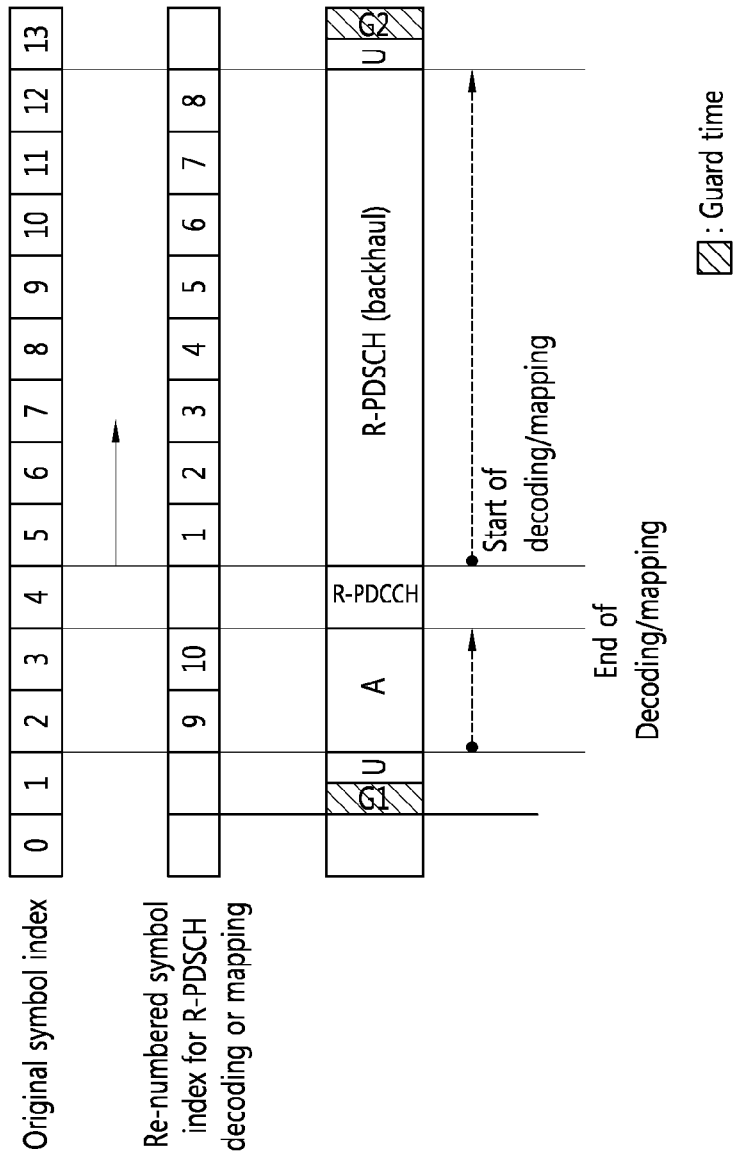
FIG. 15 shows an example of an indexing method of symbols used for R-PDSCH transmission in a normal CP.

FIG. 15 shows an example of an indexing method of symbols used for R-PDSCH transmission in a normal CP.

As shown in FIG. 15, an RN can perform decoding on a symbol having an original symbol index of 5 to a symbol having an original symbol index of 12, and thereafter can perform decoding on a symbol having an original symbol index of 2 and a symbol having an original symbol index of 3. That is, a BS can perform resource mapping in the order of symbols having original symbol indices of 5, 6, 7, 8, 9, 10, 11, 12, 2, and 3, and the RN can perform decoding.

Figure 16:
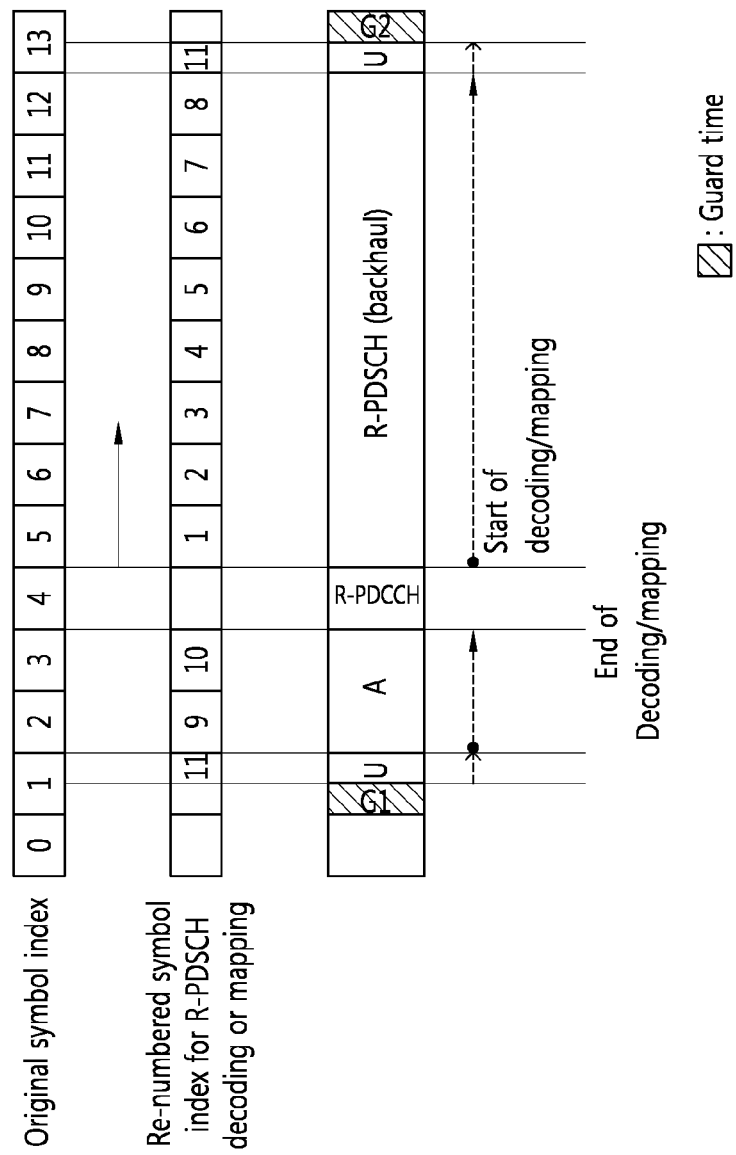
FIG. 16 shows another example of an indexing method of symbols used for R-PDSCH transmission in a normal CP.

FIG. 16 shows another example of an indexing method of symbols used for R-PDSCH transmission in a normal CP.

The example of FIG. 16 is different from the example of FIG. 15 in a sense that symbols having original symbol indices of 1 and 13 include a guard time, and a symbol duration other than the guard time in the symbol is combined into one symbol and a symbol index 11 is assigned thereto. That is, partial symbols included in the symbol including the guard time are combined to create one symbol, and a last symbol index is assigned to the created symbol. The same also applies to a case where there is no guard time or there is only one of G1 and G2.

Figure 17:
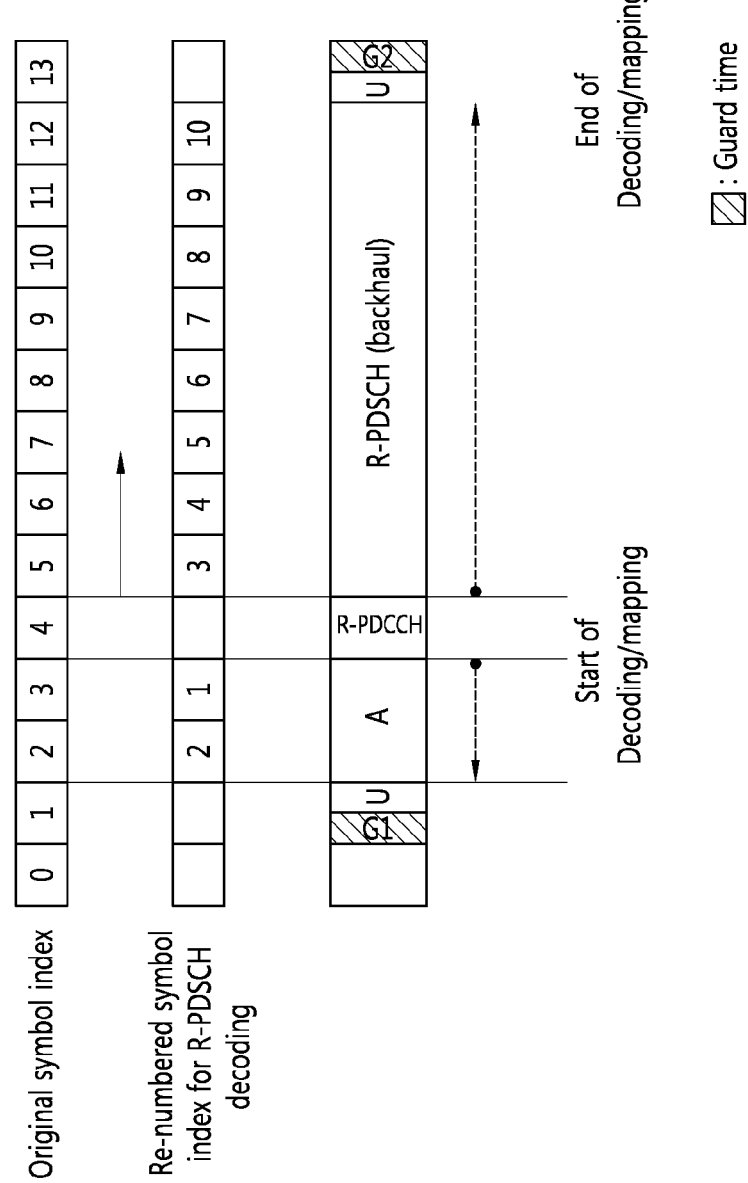
FIG. 17 and FIG. 18 show other examples of an indexing method of symbols used for R-PDSCH transmission in a normal CP.
Figure 18:
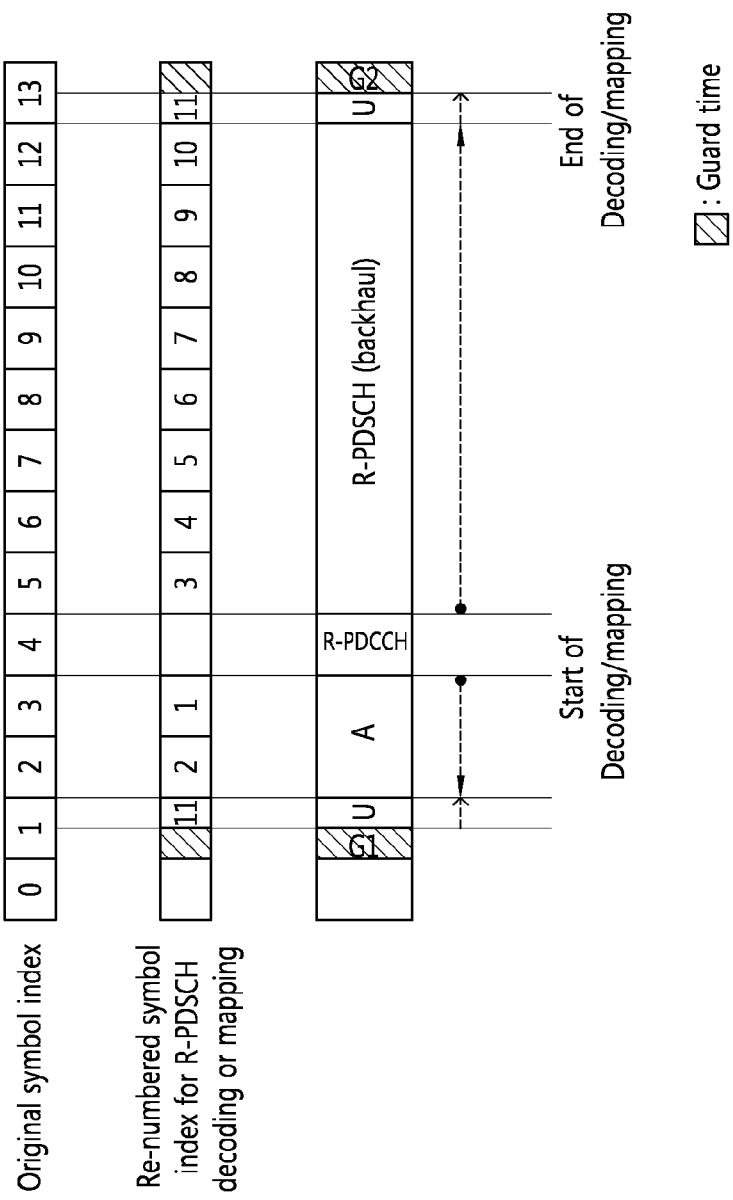

FIG. 17 and FIG. 18 show other examples of an indexing method of symbols used for R-PDSCH transmission in a normal CP.

Referring to FIG. 17, symbol indices are first assigned in a descending order in a region A, and then symbol indices are assigned in an ascending order to symbols located next to an R-PDCCH region. As shown in FIG. 17, a BS and an RN assign symbol indices in a descending order to symbols having original symbol indices of 2 and 3, and can assign symbol indices 3 to 10 to symbols having symbol indices of 5 to 12. The symbol index is identical to a decoding order of the RN. That is, the RN can perform decoding on symbols having original symbol indices of 3, 2, 5, 6, 7, 8, 9, 10, 11, 12, in that order.

The example of FIG. 18 is different from the example of FIG. 17 in a sense that symbols having original symbol indices of 1 and 13 include a guard time, and a symbol duration other than the guard time in the symbol is combined into one symbol and a symbol index 11 is assigned thereto. That is, partial symbols included in the symbol including the guard time are combined to create one symbol, and a last symbol index is assigned to the created symbol.

Figure 19:
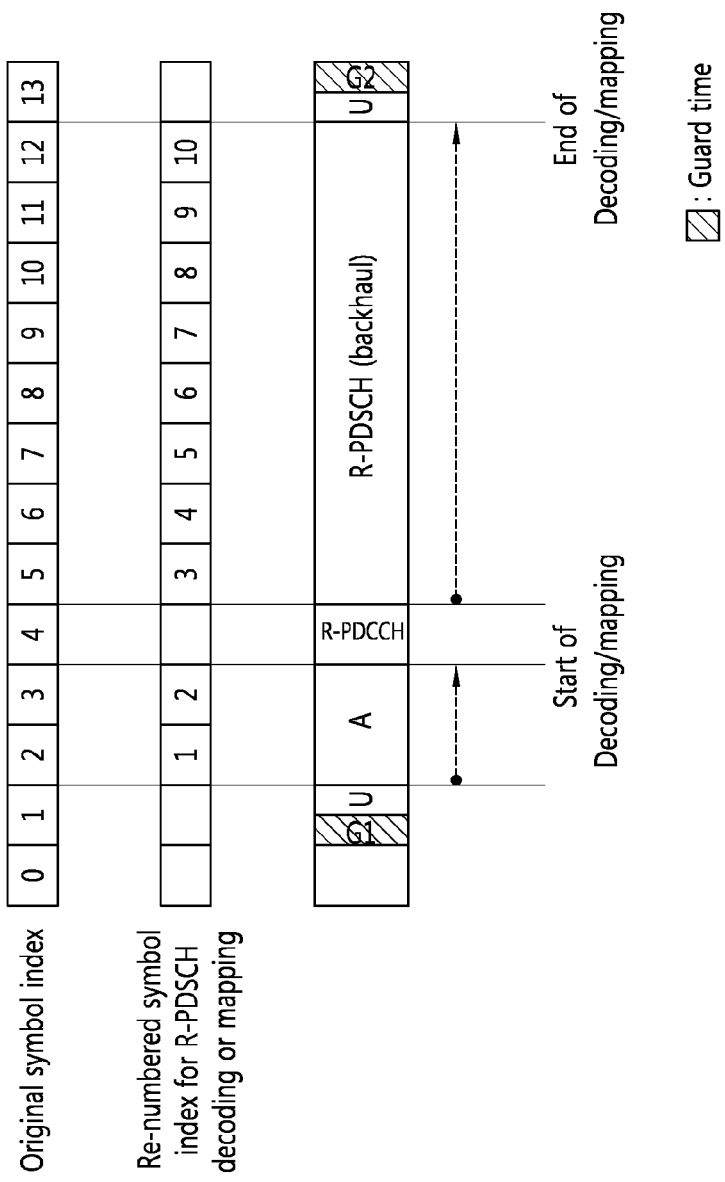
FIG. 19 and FIG. 20 show other examples of an indexing method of symbols used for R-PDSCH transmission in a normal CP.
Figure 20:
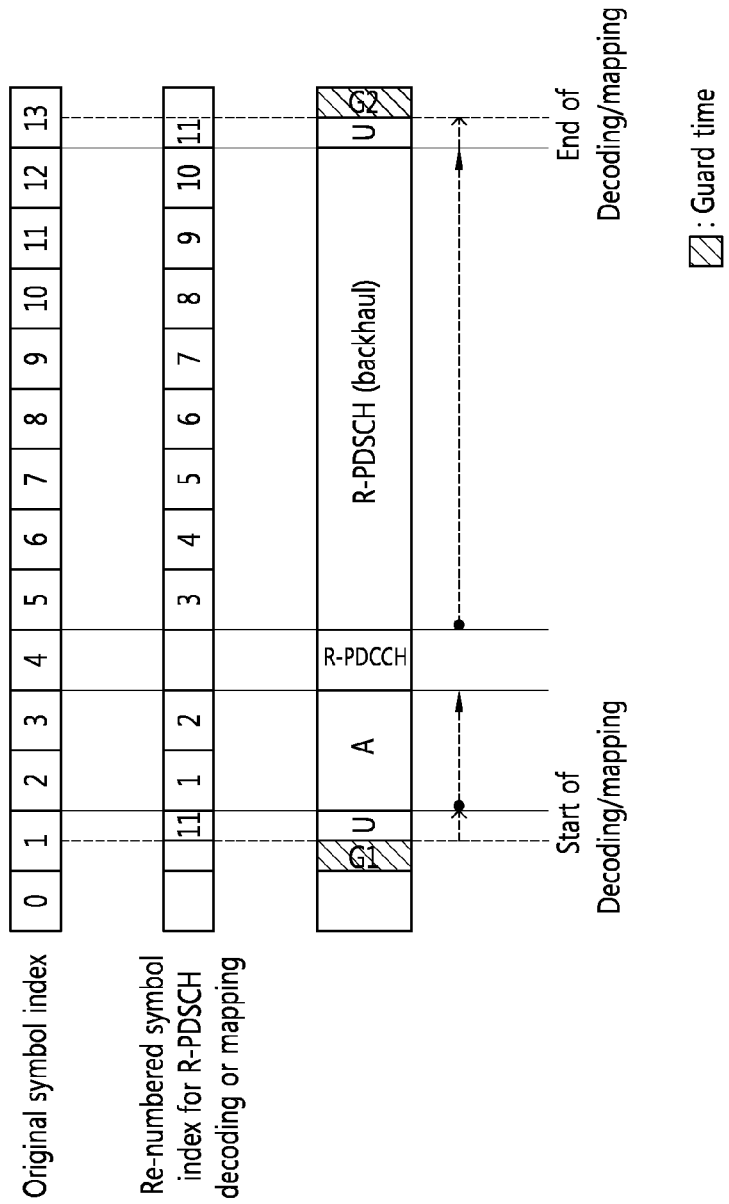

FIG. 19 and FIG. 20 show other examples of an indexing method of symbols used for R-PDSCH transmission in a normal CP.

The example of FIG. 19 is different from the example of FIG. 17 in a sense that symbol indices are first assigned in an ascending order and then symbol indices are assigned in an ascending order to symbols located next to an R-PDCCH region. The example of FIG. 20 is different from the example of FIG. 19 in a sense that symbols having original symbol indices of 1 and 13 include a guard time, and a symbol duration other than the guard time in the symbol is combined into one symbol and a symbol index 11 is assigned thereto. That is, an RN lastly decodes a region U.

In FIG. 15 to FIG. 20, the R-PDCCH region can move to another symbol position semi-statically by using a higher layer signal. Alternatively, for convenience of implementation, it can be fixed to a specific symbol position. In addition, in FIG. 15 to FIG. 20, the region A and the region U can be designed using various methods as follows.

1. A method in which data (or a control signal) of the region A and/or the region U can be decoded without information of the R-PDCCH.

2. A method in which data (or a control signal) of the region A and/or the region U can be decoded using additional semi-static signaling by using a physical layer or a higher layer without information of the R-PDCCH.

3. A method in which data (or a control signal) of the region A and/or the region U can be decoded using predetermined decoding information. In this case, decoding can be performed without having to receive any control signal.

4. A method in which data (or a control signal) of the region A and/or the region U can be decoded blindly without any decoding information, or a method in which decoding is performed using minimum decoding information such as a method of using a set of predetermined decoding information.

Figure 21:
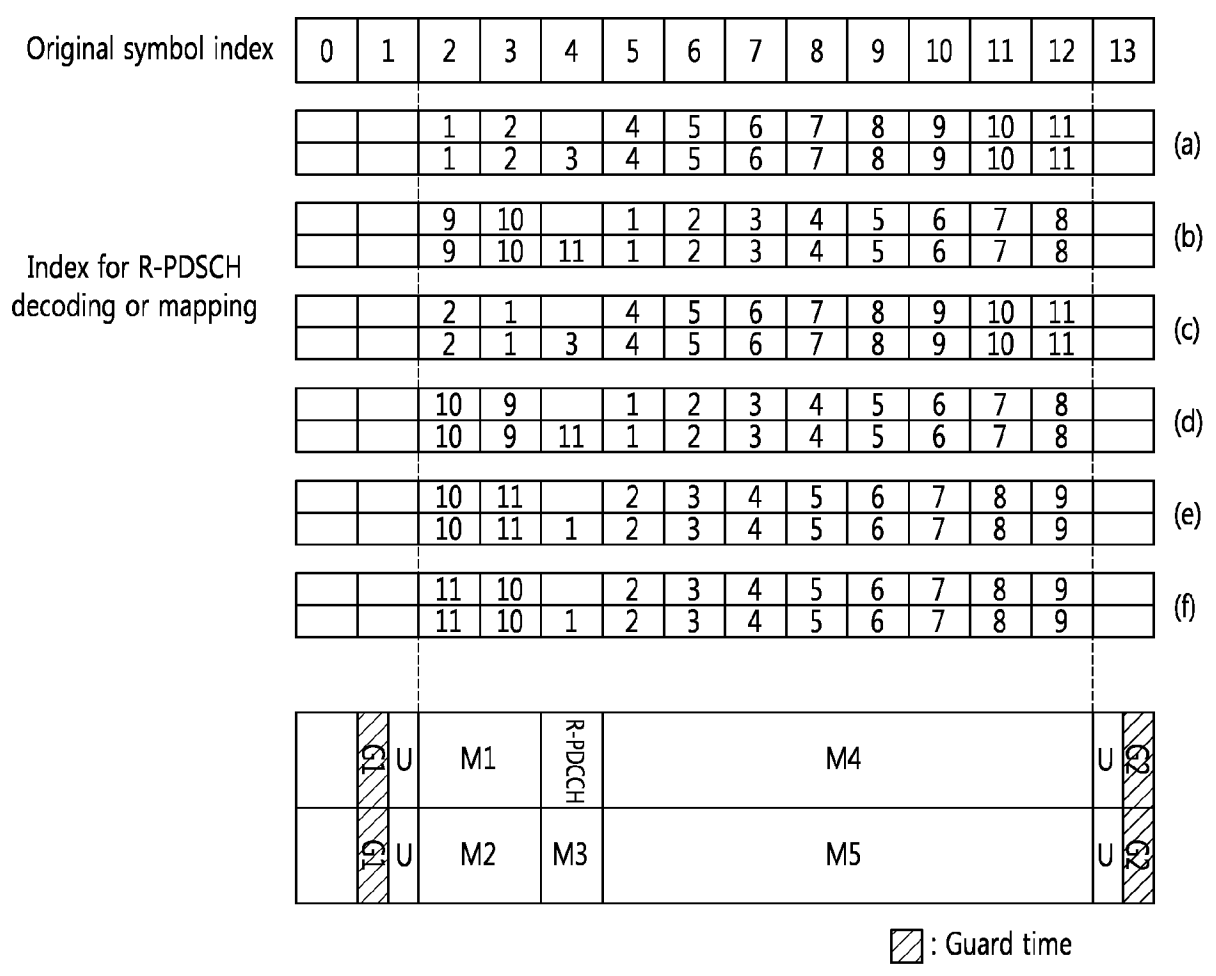

FIG. 21 shows an example of an indexing method of symbols used for R-PDSCH transmission when a resource region in which an R-PDCCH is located in a frequency band allocated to an RN coexist with a resource region in which the R-PDCCH is not located. A normal CP is assumed in FIG. 21.

Referring to FIG. 21, a region in which an R-PDSCH is transmitted in a backhaul link subframe can be divided into regions M1, M2, M3, M4, and M5. The regions M1 and M4 are resource regions located in the same frequency band as the R-PDCCH region. In a time domain, the region M is a backhaul transmission-permitted resource region located ahead of the R-PDCCH region, and the region M4 is a backhaul transmission-permitted resource region located next to the R-PDCCH region. The regions M2, M3, and M5 are resource regions located in a frequency band not including the R-PDCCH region. In a time domain, the region M2 is a backhaul transmission-permitted resource region located ahead of the R-PDCCH region, the region M5 is a backhaul transmission-permitted resource region located next to the R-PDCCH region, and the region M is a backhaul transmission-permitted resource region located at the same position as the R-PDCCH Region. In this case, various methods of FIG. 21A to FIG. 21F can be used for a symbol indexing order with respect to a resource to which the R-PDSCH can be allocated.

FIG. 21A shows an example in which a symbol index is assigned in an ascending order in an R-PDSCH region. In FIG. 21B, a symbol index is assigned first in an ascending order in a region M4, and then a symbol index is assigned in an ascending order in a region M1. The symbol index is assigned in the order of the regions M5, M2, and M3. In each region, the symbol index is assigned in an ascending order. In FIG. 21C, a symbol index is assigned in a descending order in a region M1, and a symbol index is assigned in an ascending order in a region M4. The symbol index is assigned in the order of the regions M2, M3, and M5. The symbol index is assigned in a descending order in the region M2, and is assigned in an ascending order in the region M5. In FIG. 21D, a symbol index is assigned in an ascending order in a region M4, and a symbol index is assigned in a descending order in a region M1. The symbol index is assigned in the order of the regions M5, M2, and M3. The symbol index is assigned in an ascending order in the region M5, and is assigned in a descending order in the region M2. In FIG. 21E, a symbol index is assigned in an ascending order in a region M4, and a first symbol index is set to 2. The symbol index is assigned in an ascending order in a region M1. The symbol index is assigned in the order of the regions M3, M5, and M2. In each region, the symbol index is assigned in an ascending order. In FIG. 21F, a symbol index is assigned in the order of regions M4 and M1. The symbol is assigned in an ascending order in the region M4. The symbol is assigned in a descending order in the region M1. The symbol index is assigned in the order of regions M3, M5, and M2. The symbol index is assigned in an ascending order in the region M5, and is assigned in a descending order in the region M2.

Now, a resource mapping method applicable to a resource region in which an R-PDSCH is transmitted will be described.

1. Frequency resource first mapping

Mapping can be performed first in a frequency domain in a unit of a subcarrier, a resource element group (REG), a resource block (RB), etc., and then can be performed again to next symbols in the frequency domain. Mapping is continued in a time order until all available symbols are mapped to an R-PUSCH. For example, mapping is performed on resources M1 and M2, followed by a resource M3 and then a resource M5.

2. Mapping R-PDSCH region first and then puncturing R-PDCCH region

Frequency resource first mapping is performed and then R-PDSCH mapping including an R-PDCCH region is performed. Thereafter, the R-PDCCH region is punctured. This method can be performed similarly to a method of performing ACK/NACK puncturing in a PUSCH in LTE or a method of multiplexing a CQI.

3. A method for performing frequency resource first mapping starting from a symbol next to a symbol in which an R-PDCCH is located Frequency resource first mapping starts at a symbol located next to a symbol in which the R-PDCCH is located. Mapping is performed on up to a last symbol in which the R-PDSCH is transmitted in a subframe and then the R-PDSCH is mapped to a resource region located ahead of an R-PDCCH symbol. In this manner, mapping is performed on up to a symbol located ahead of the R-PDCCH.

Figure 22:
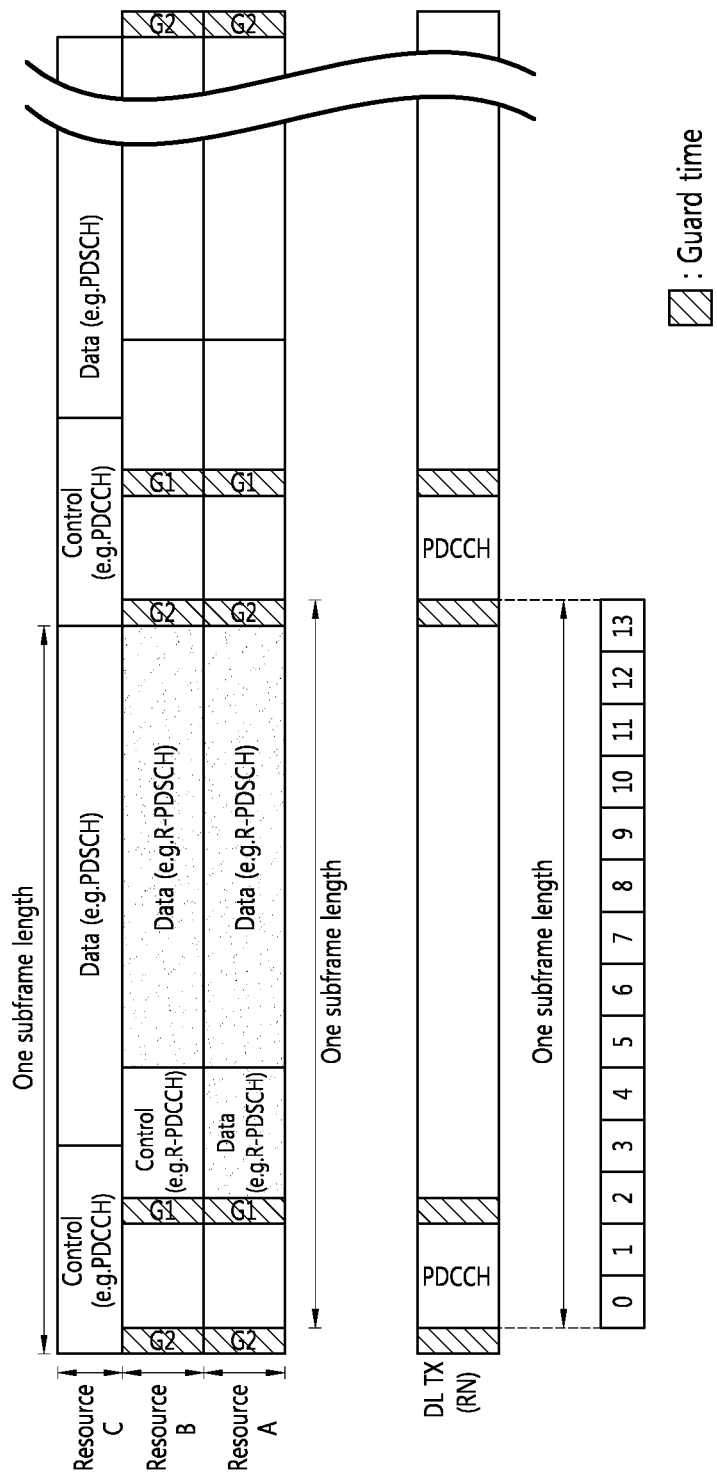
FIG. 22 shows an example of a resource allocation of a backhaul link subframe in a plurality of subframes.

FIG. 22 shows an example of a resource allocation of a backhaul link subframe in a plurality of subframes.

Referring to FIG. 22, an RN transmits an access PDCCH to an RN-UE by using two symbols in a subframe, and receives a B-DL signal from a BS after a guard time elapses. As shown in FIG. 22, a backhaul resource for transmitting an R-PDSCH by the BS may differ depending on a frequency band (see resource A and resource B). Therefore, a problem may arise regarding how to perform resource mapping in the backhaul resource for transmitting the R-PDSCH. Hereinafter, a resource mapping method of a backhaul resource will be described. Although it is shown in FIG. 22 that subframe boundaries are aligned between a subframe of a macro link and a subframe of a backhaul link, the present invention is not limited thereto. That is, the resource mapping method of the backhaul resource can equally apply to a case where the subframe boundaries are matched between the subframe of the macro link and the subframe of the backhaul link.

FIG. 23 to FIG. 46 show examples of a resource mapping method of a backhaul resource.

Figure 23:
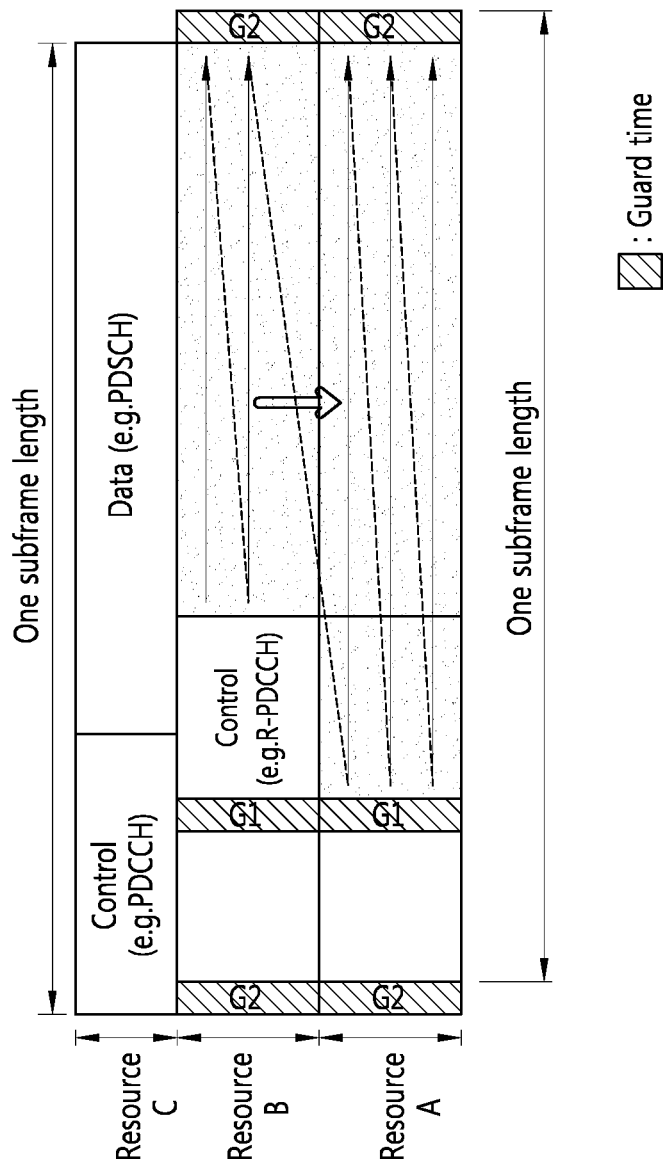
FIG. 23 to FIG. 46 show examples of a resource mapping method of a backhaul resource.
Figure 24:
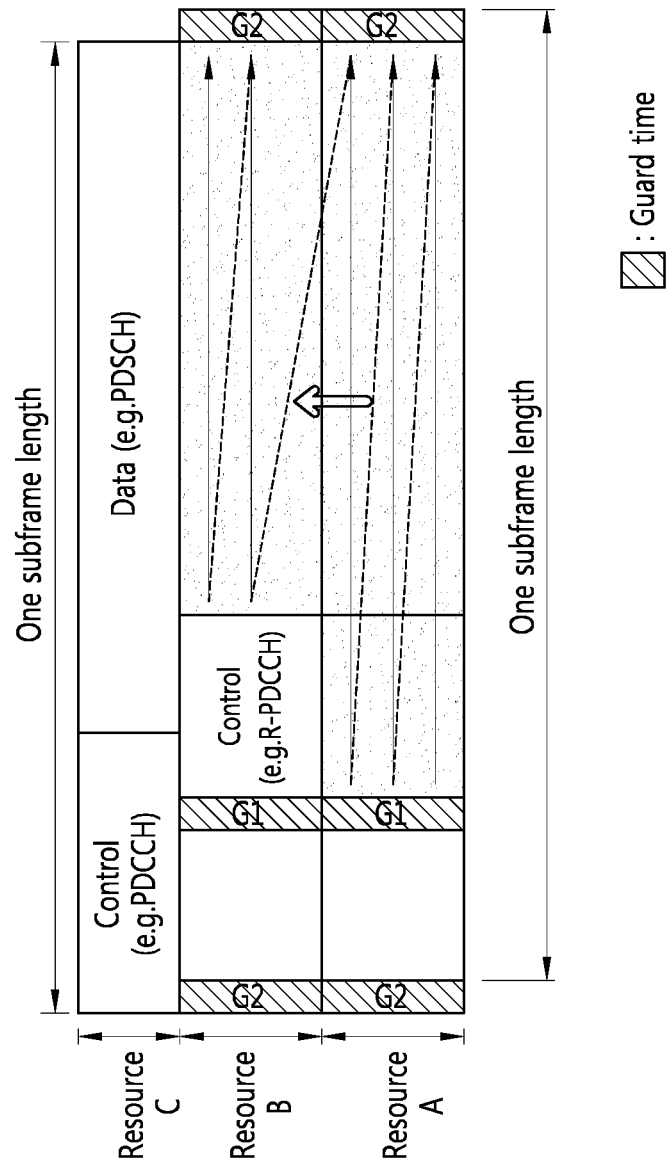

Referring to FIG. 23, resource mapping is performed (for example, in a unit of a resource element) on a symbol located next to an R-PDCCH region in a frequency band including an R-PDCCH region, and then resource mapping is performed on a frequency band not including the R-PDCCH region. In FIG. 24, resource mapping is performed on a frequency band not including an R-PDCCH region, and then resource mapping is performed on a frequency band including the R-PDCCH region. That is, FIG. 23 and FIG. 24 show examples in which mapping is performed first in a time axis and then resource mapping is performed in an adjacent frequency axis.

A method of performing resource mapping first in a time axis and then performing resource mapping in a frequency axis can be performed orderly for each resource region.

Figure 25:
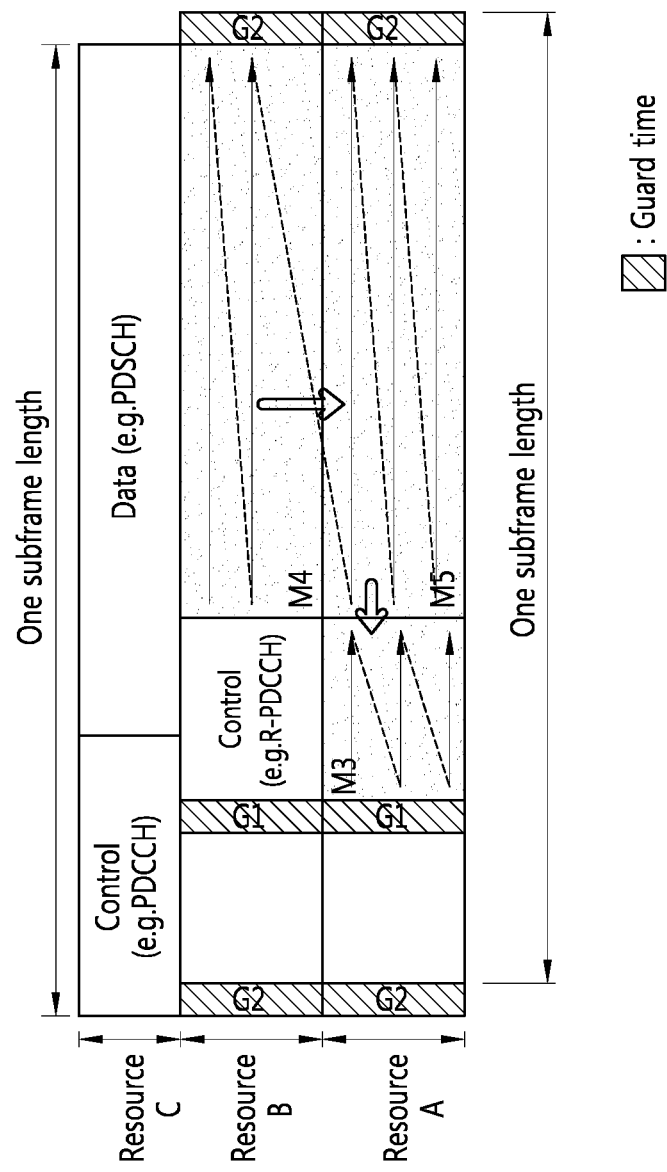
Figure 26:
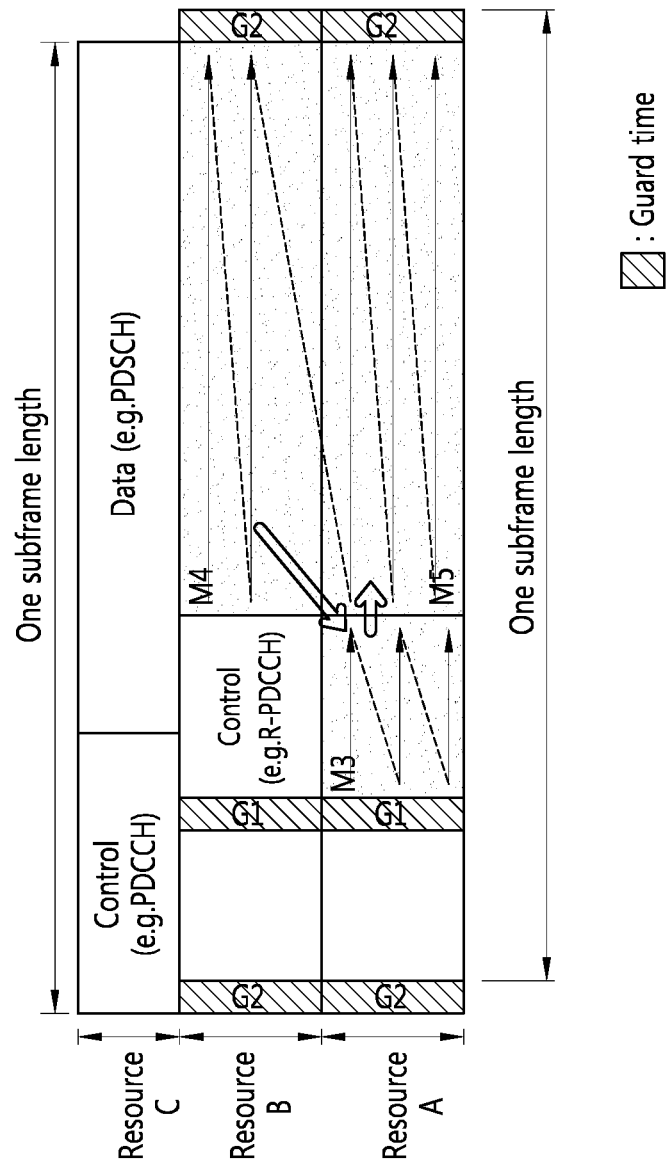
Figure 27:
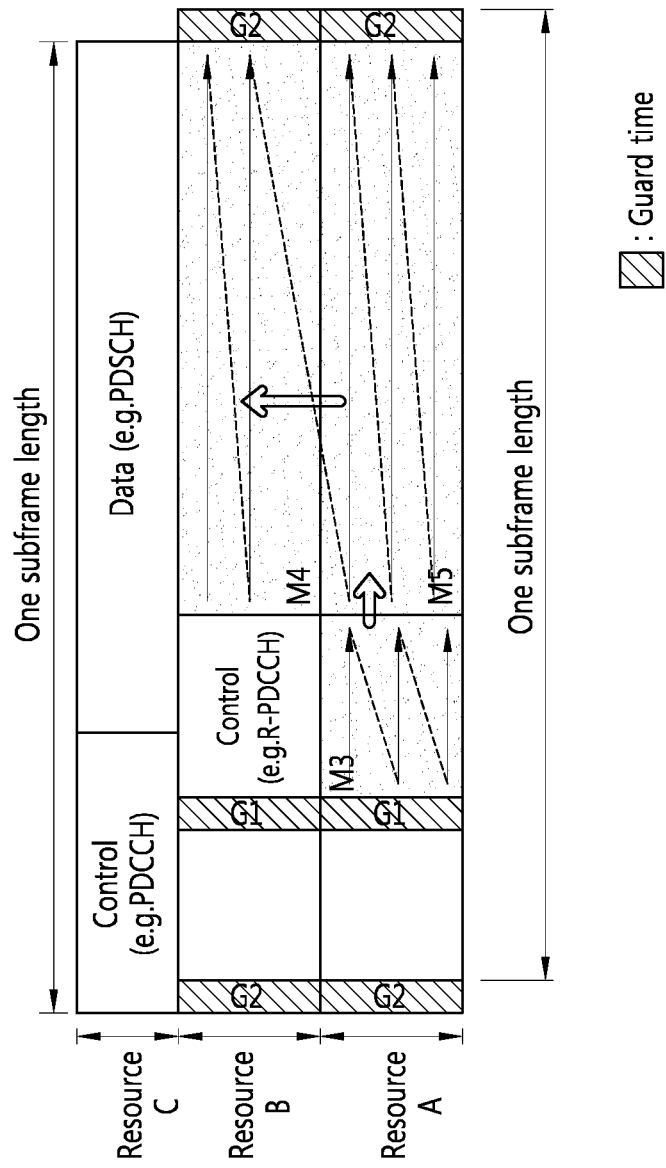
Figure 28:
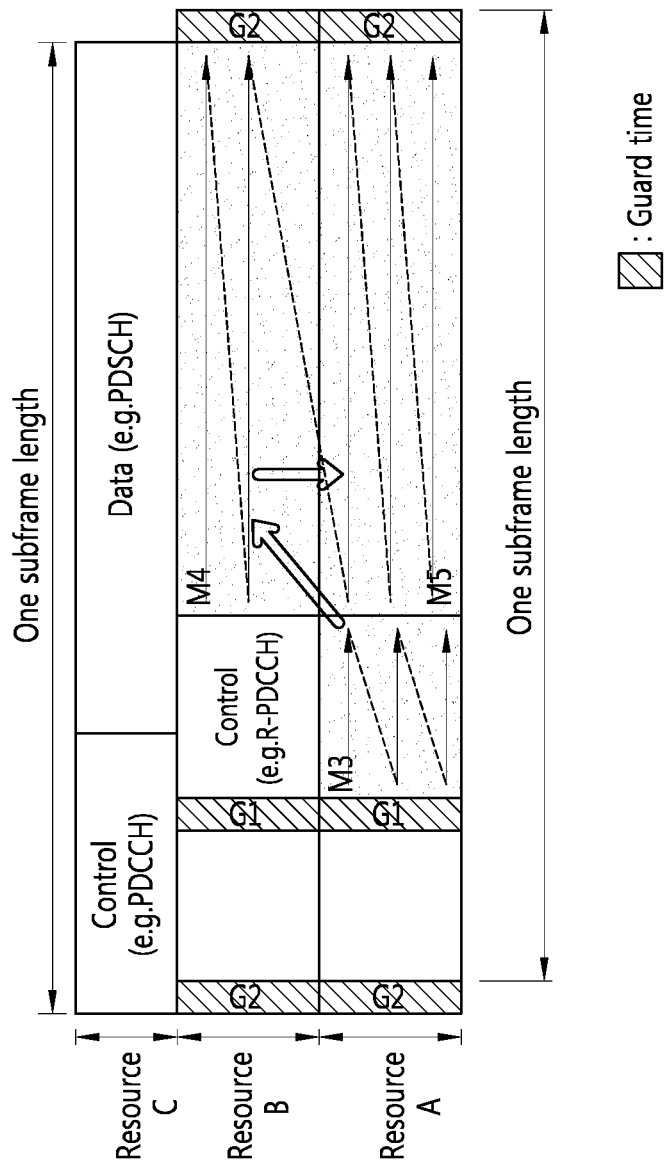
Figure 29:
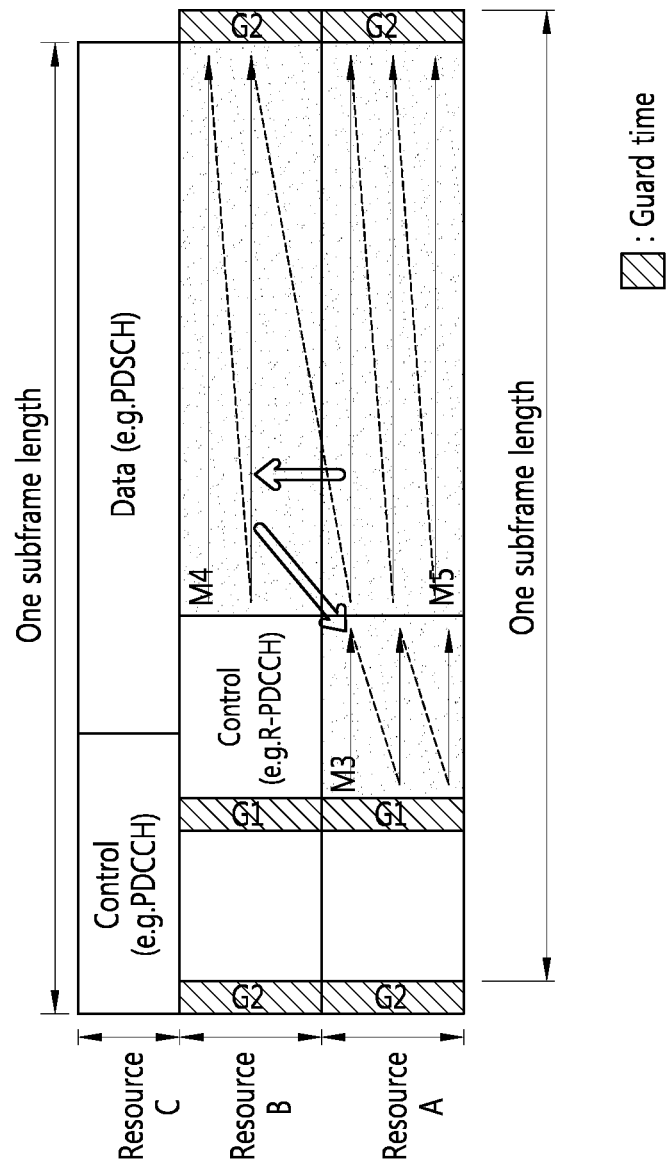
Figure 30:
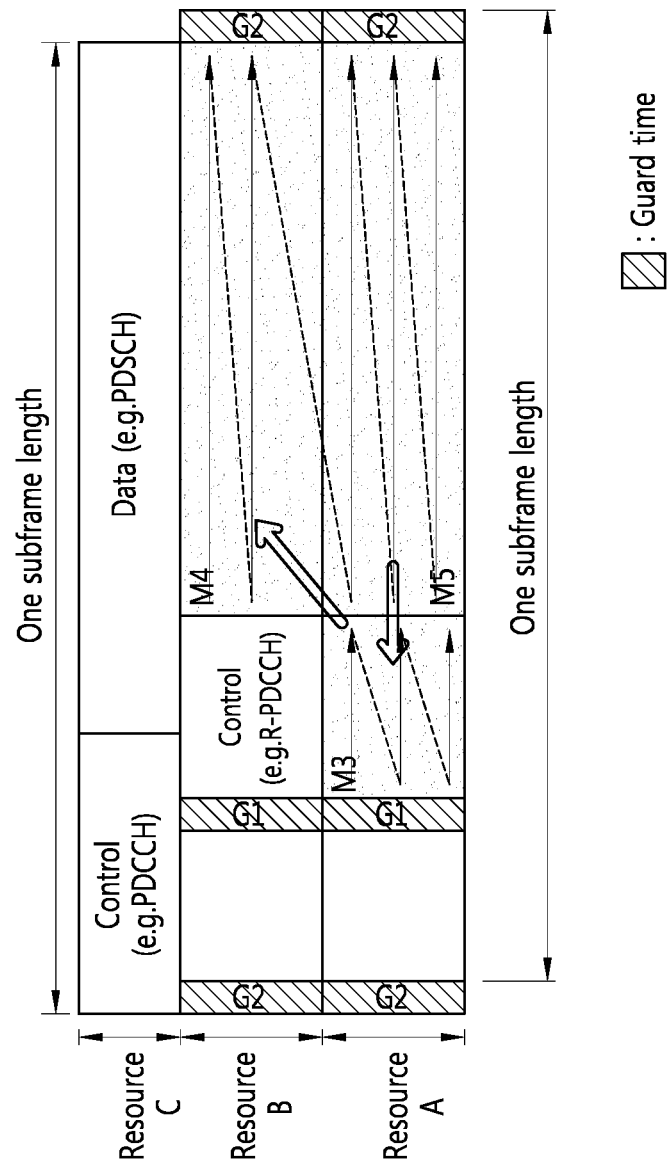
Figure 31:
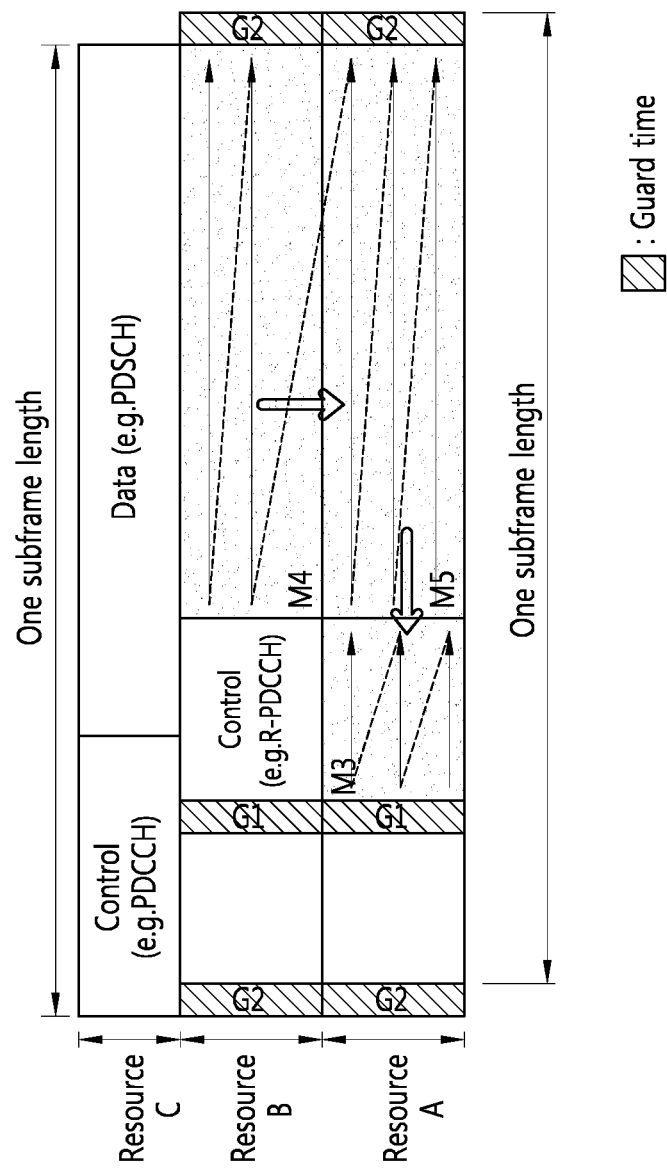
Figure 32:
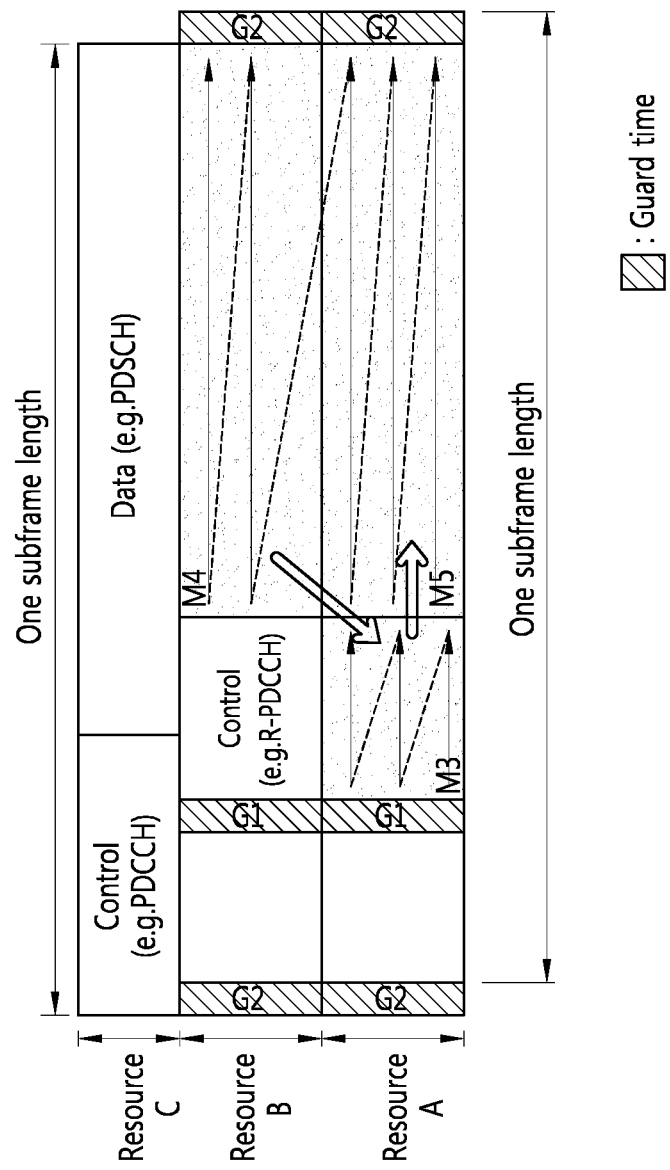
Figure 33:
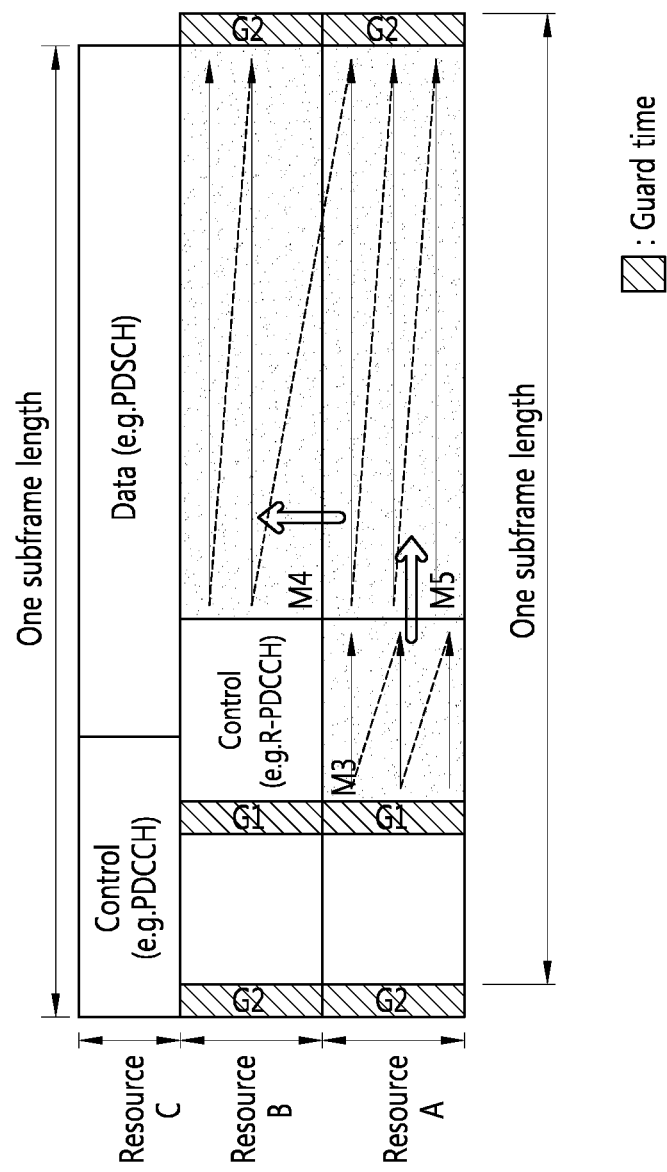
Figure 34:
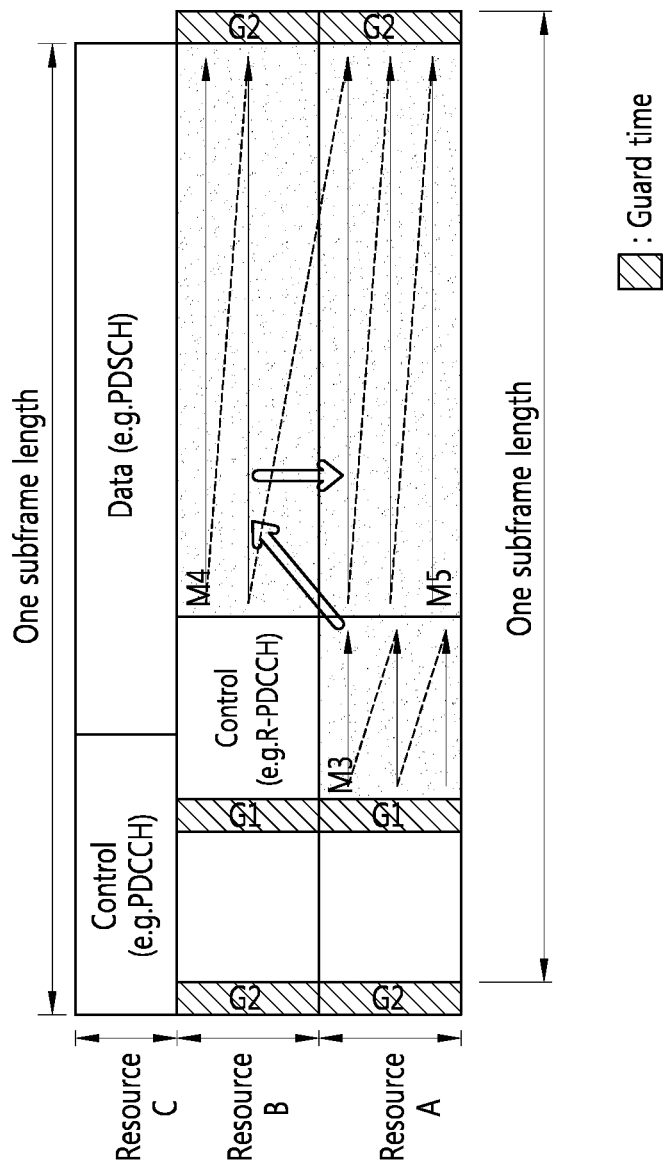
Figure 35:
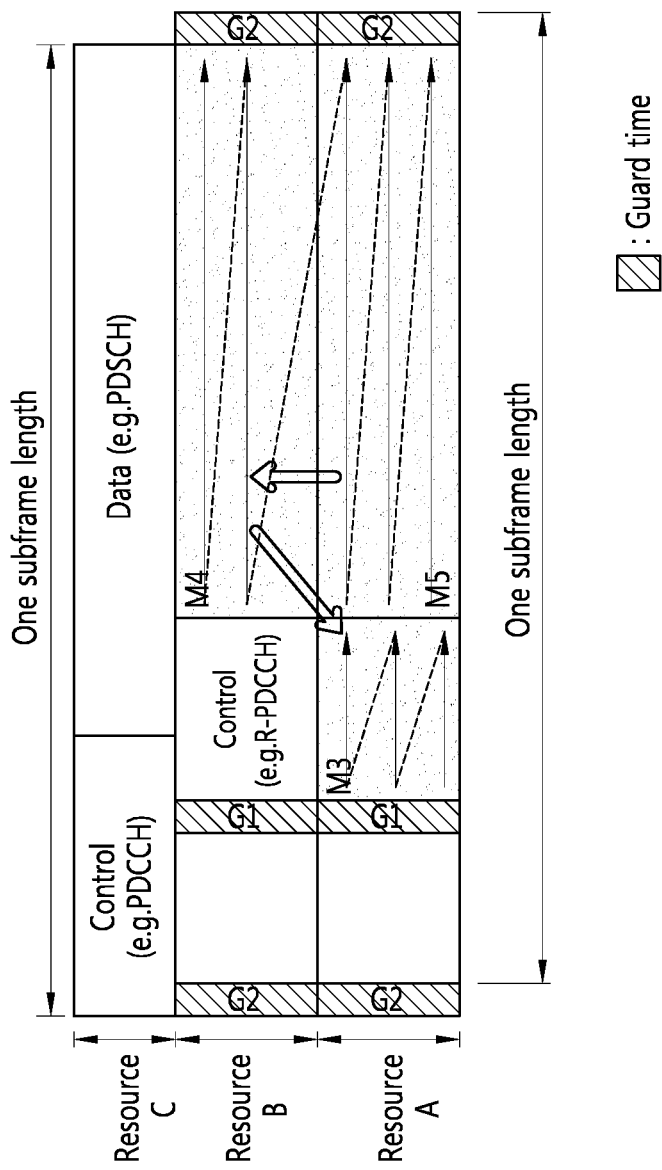
Figure 36:
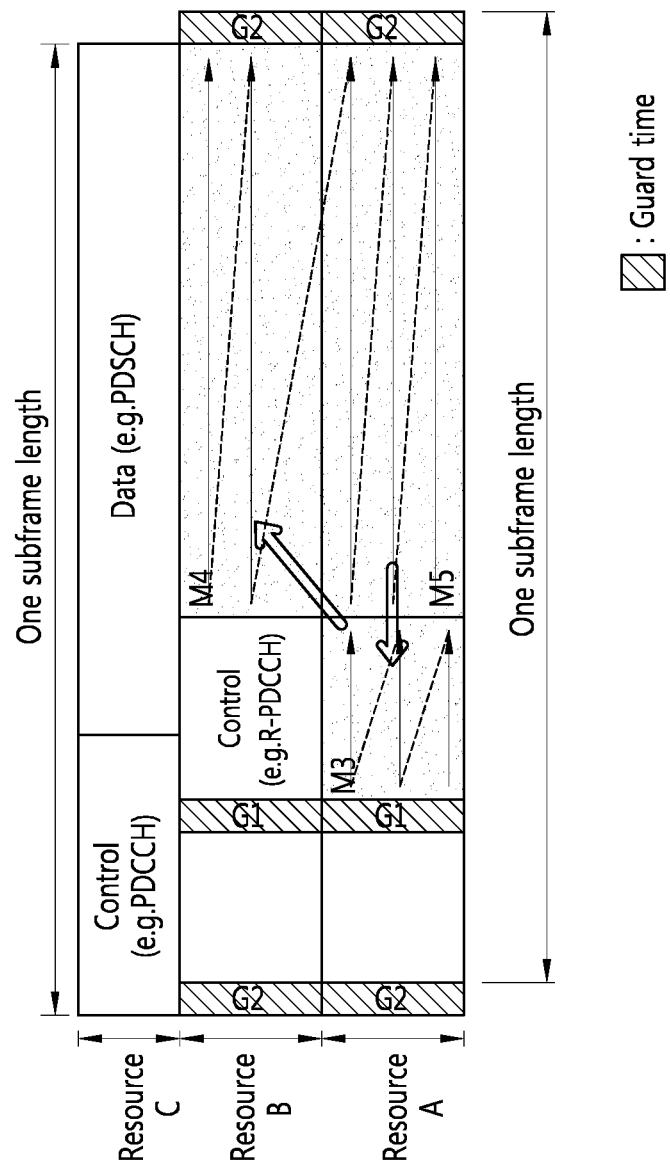

FIG. 25 shows an example of performing resource mapping in the order of regions M4, M5, and M3. FIG. 26 shows an example of performing resource mapping in the order of regions M4, M3, and M5. FIG. 27 shows an example of performing resource mapping in the order of regions M3, M5, and M4. FIG. 28 shows an example of performing resource mapping in the order of regions M3, M4, and M5. FIG. 29 shows an example of performing resource mapping in the order of regions M5, M4, and M3. FIG. 30 shows an example of performing resource mapping in the order of regions M5, M3, and M4.

Resource mapping can be performed first in a time axis and then performed in a frequency axis by using various methods as shown in FIG. 25 to FIG. 30. In this case, it is not necessary for the region M3 to correctly coincide with the R-PDCCH region in the time domain.

In addition, the R-PDCCH region can be multiplexed by performing rate matching in consideration of an amount of control information and a size of a reserved resource region. The R-PDCCH region can be multiplexed by using a no-mapping method or a puncturing method. When using the puncturing method, multiplexing can be achieved, for example, by mapping data to the R-PDCCH region and the R-PDSCH region and then by performing puncturing by an amount of control information or a size of a resource region required for the control information. When the guard time is not included, non-mapping, rate matching, or puncturing is used.

FIG. 31 to FIG. 36 are respectively different from FIG. 25 to FIG. 30 in terms of a mapping order in a frequency axis. For example, in case of FIG. 31, a mapping order of a resource region is M4, M5, and M3 similarly to the case of FIG. 25, but mapping is performed in a direction from top to bottom in each resource region in FIG. 25 while resource mapping is performed in a direction from down to top in FIG. 31. Such a difference is determined according to how a resource element index is determined in the frequency axis.

Figure 37:
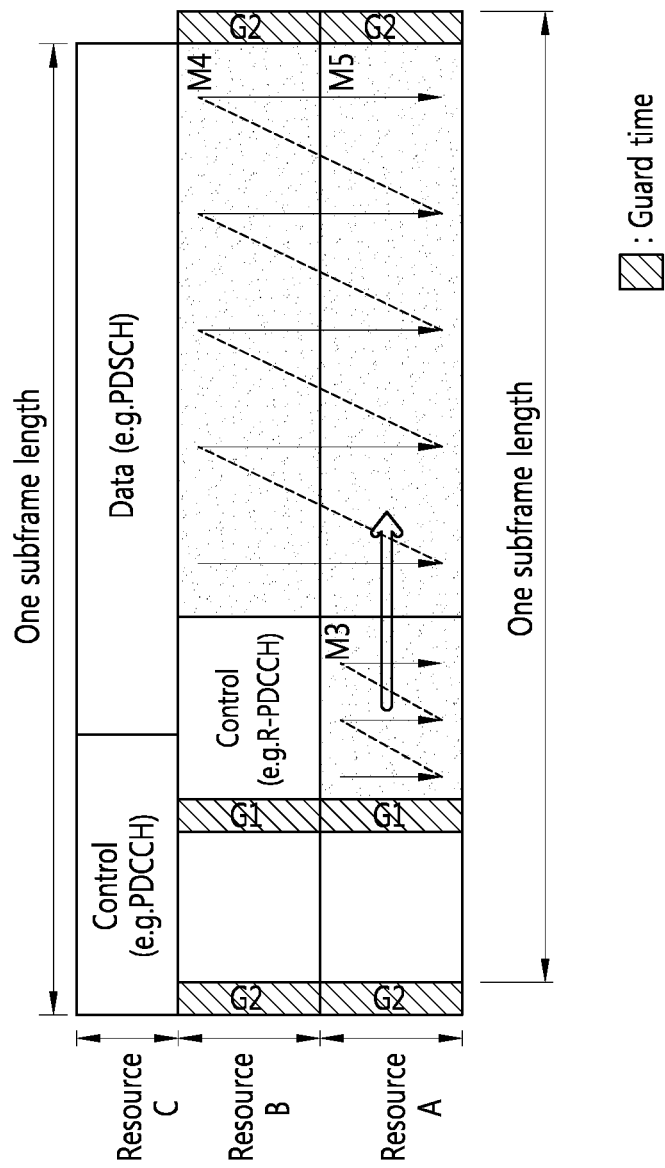
Figure 38:
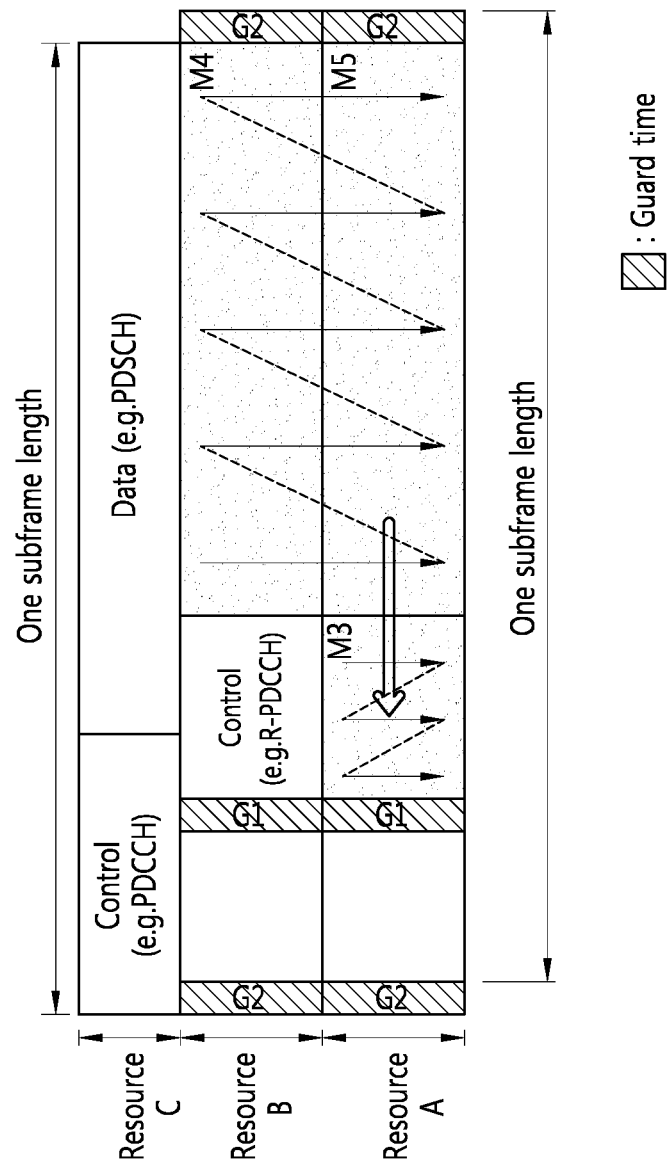

FIG. 37 shows a frequency-first mapping method. Referring to FIG. 37, resource mapping is performed on a resource element column along a frequency axis in a region M3 and then mapping is performed on a next resource element column. Upon the completion of resource mapping on the region M3, resource mapping is performed on a region (M4+M5). FIG. 38 shows an example in which frequency-first mapping is performed first on a region (M4+M5) and then resource mapping is performed on a region M3.

Figure 39:
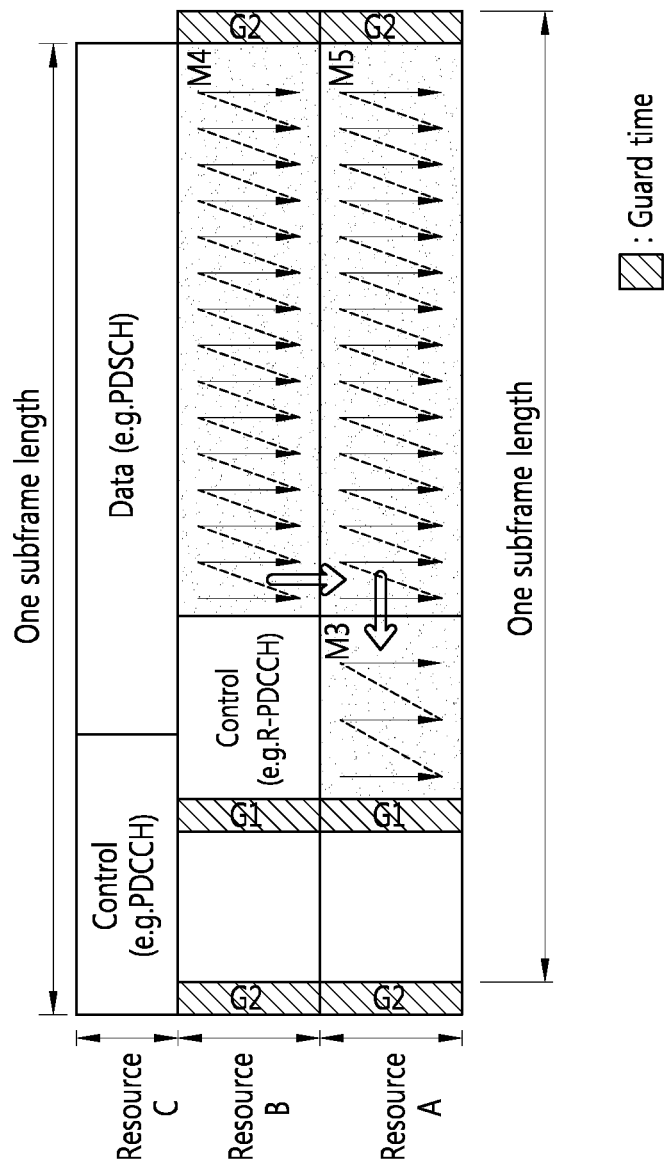
Figure 40:
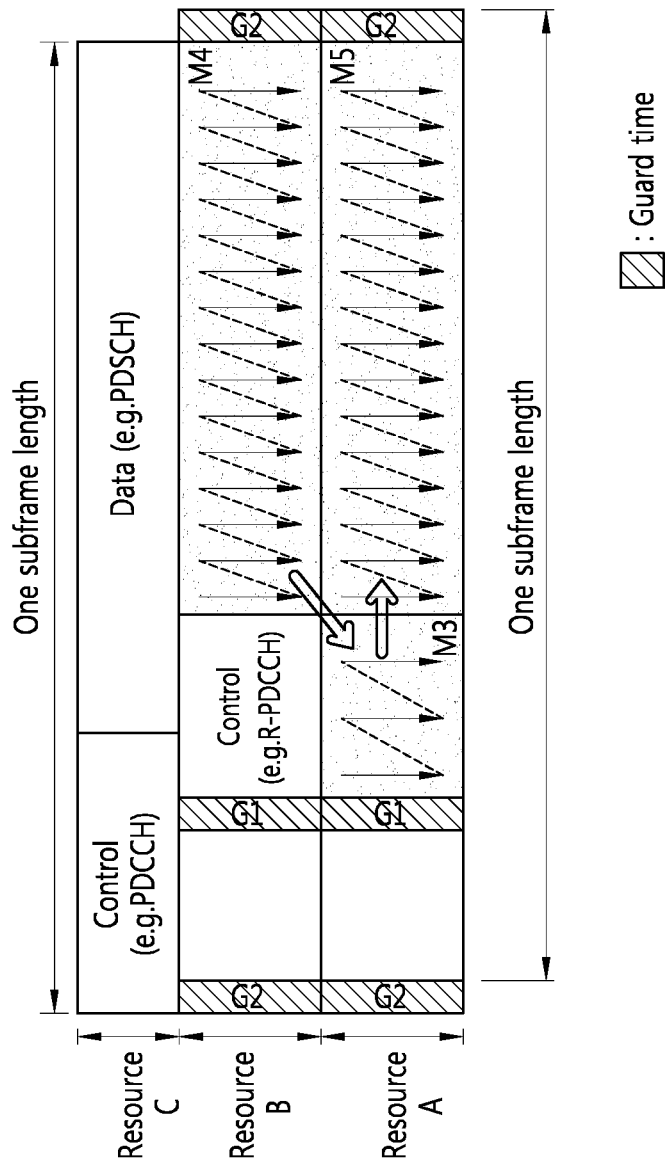
Figure 41:
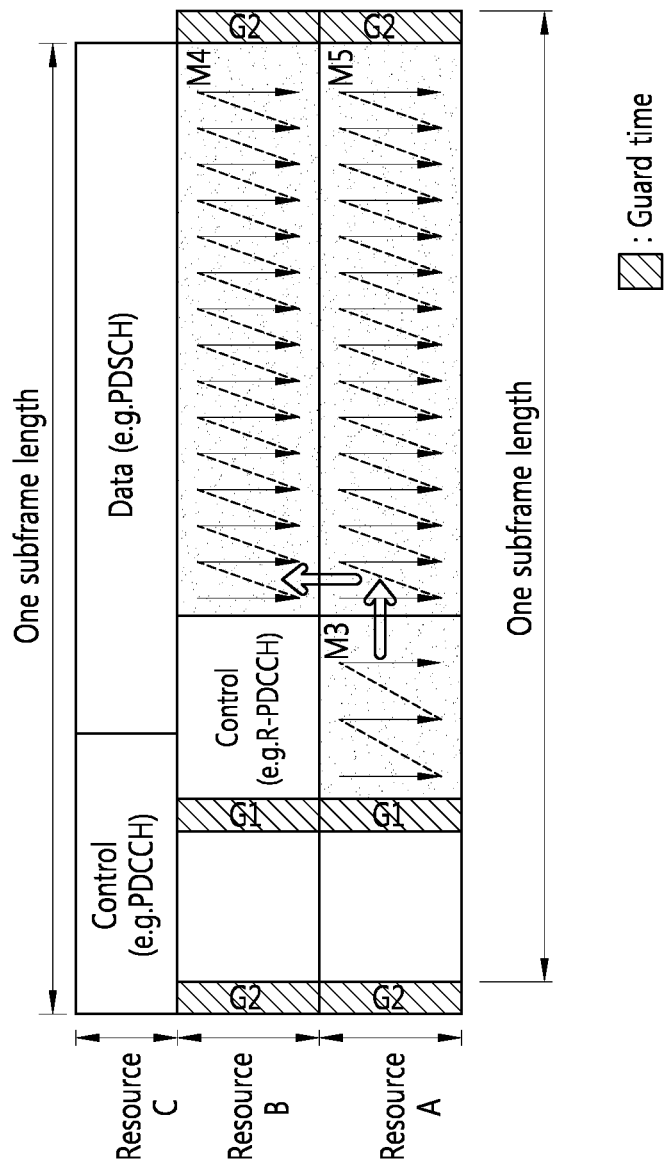
Figure 42:
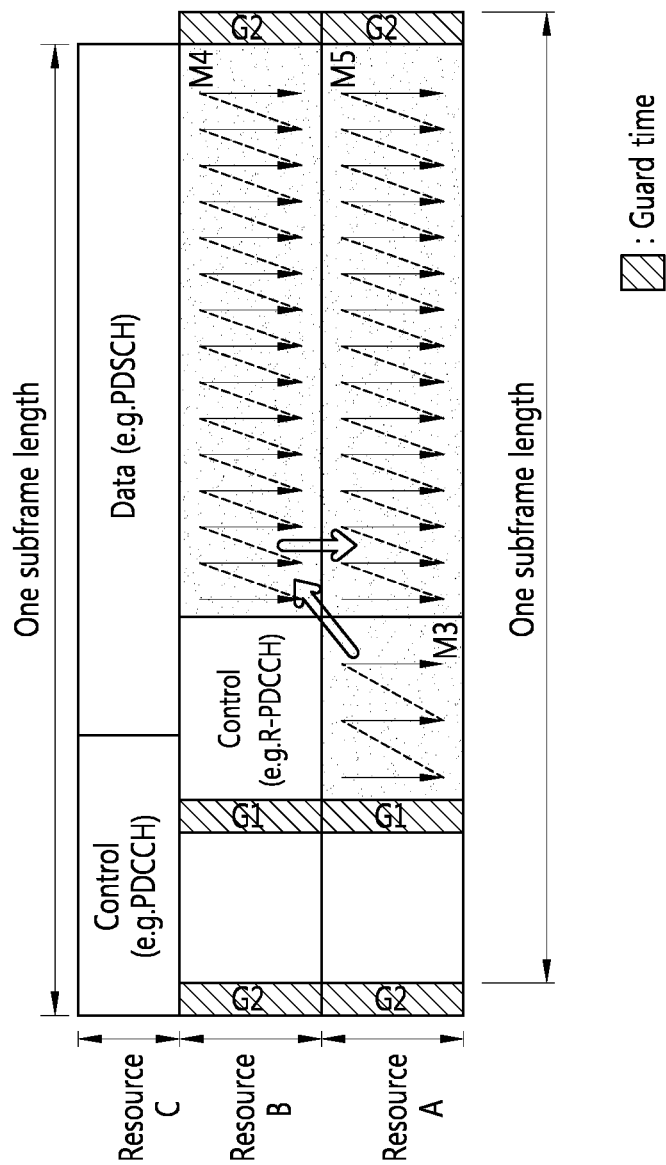
Figure 43:
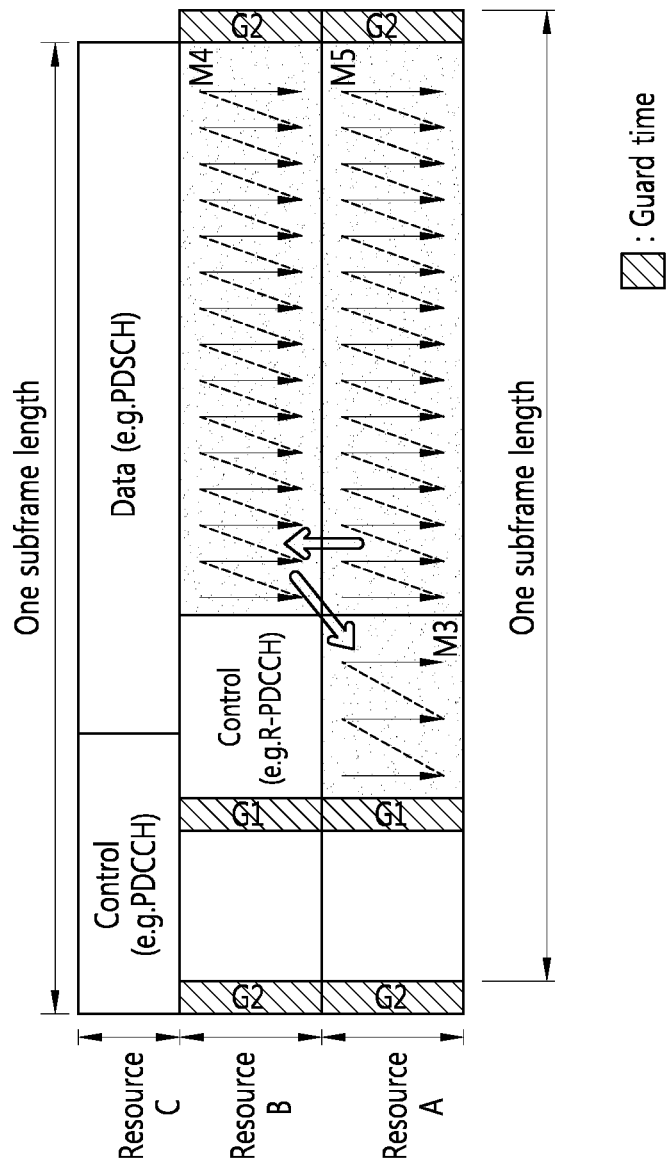
Figure 44:
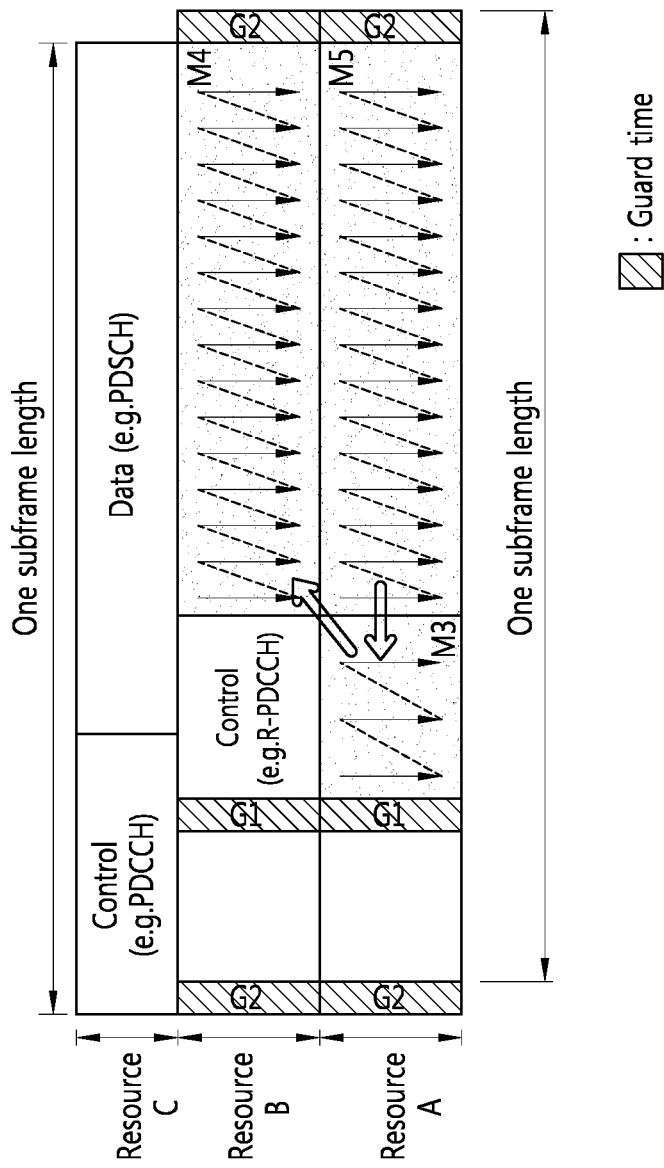

FIG. 39 to FIG. 44 show examples of performing frequency-first mapping for respective resource regions. In FIG. 39, resource mapping is performed in the order of regions M4, M5, and M3. In FIG. 40, resource mapping is performed in the order of regions M4, M3, and M5. In FIG. 41, resource mapping is performed in the order of regions M3, M5, and M4. In FIG. 42, resource mapping is performed in the order of regions M3, M4, and M5. In FIG. 43, resource mapping is performed in the order of regions M5, M4, and M3. In FIG. 44, resource mapping is performed in the order of regions M5, M3, and M4.

Figure 45:
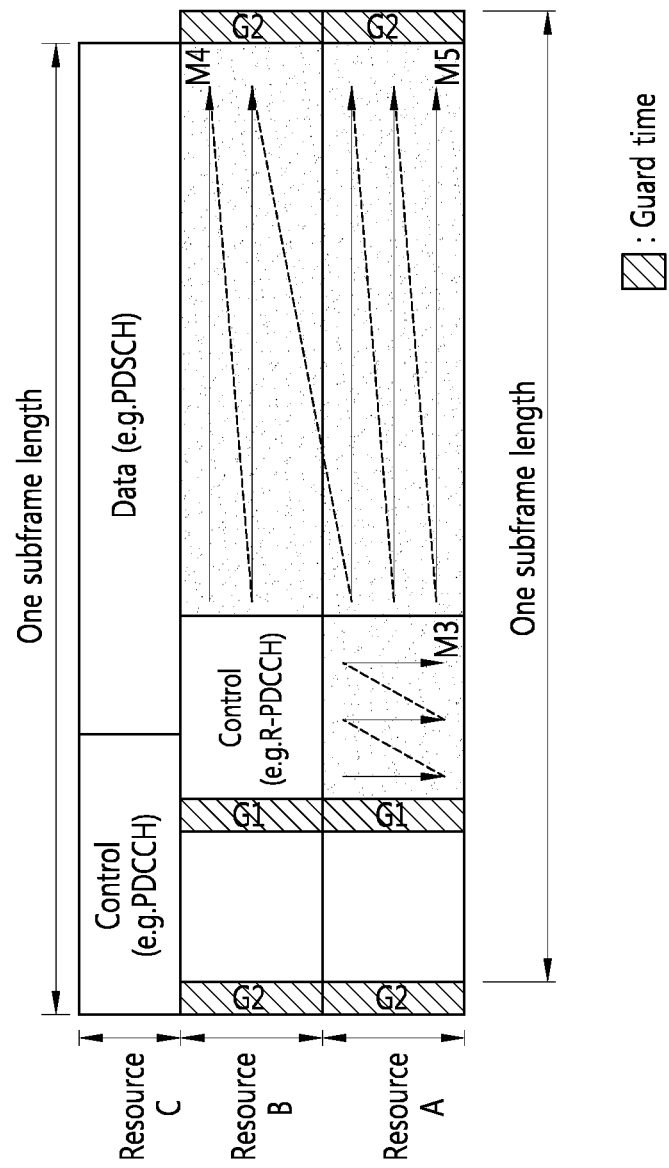

FIG. 45 shows an example of using any one of time-first mapping and frequency-first mapping for each resource region.

Referring to FIG. 45, frequency-first mapping is performed in a region M3, and time-first mapping is performed in each of regions M4 and M5. In this case, frequency-first mapping or time-first mapping can be performed in an R-PDCCH region. When applying any one of time-first mapping and frequency-first mapping to each resource region as shown in FIG. 45, the order of resource regions to which resource mapping is performed may be any one of (M4, M5, M3), (M4, M3, M5), (M3, M5, M4), (M3, M4, M5), (M5, M3, M4), (M5, M4, M3).

Figure 46:
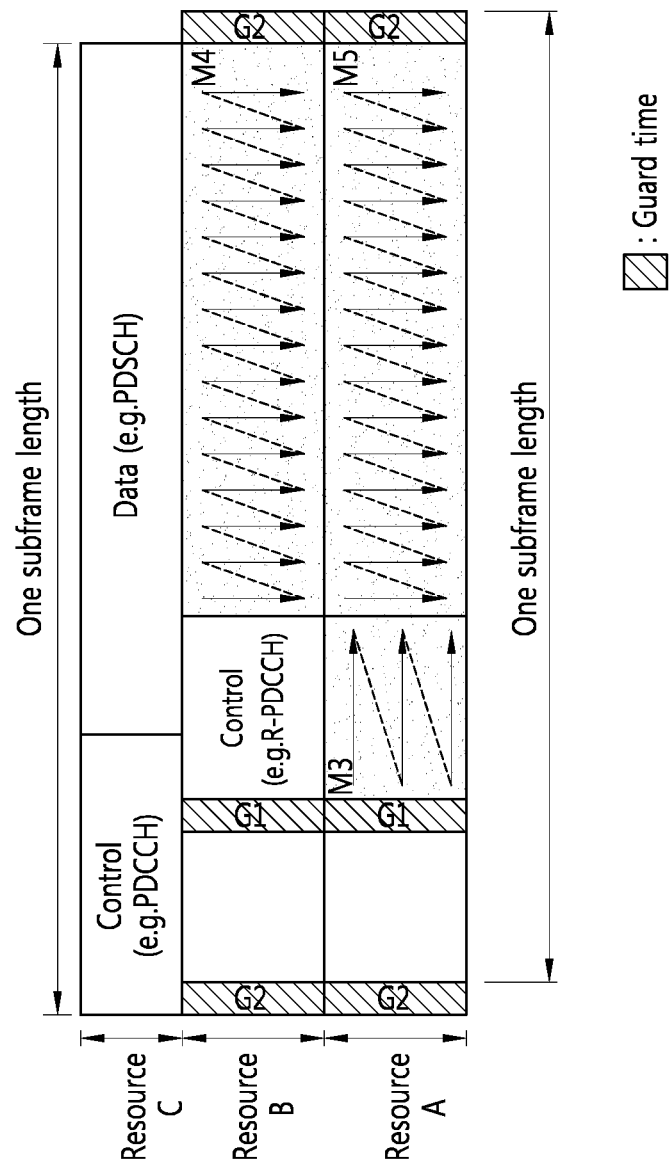

FIG. 46 shows another example of using any one of time-first mapping and frequency-first mapping for each resource region.

Referring to FIG. 46, time-first mapping is performed in a region M3, and frequency-first mapping is performed in each of regions M4 and M5. In this case, an order of resource regions to which resource mapping is performed is any one of (M4, M5, M3), (M4, M3, M5), (M3, M5, M4), (M3, M4, M5), (M5, M3, M4), (M5, M4, M3).

Although a case where timing is misaligned between a subframe of a backhaul link and a subframe of a macro link in the aforementioned resource mapping method described with reference to FIG. 22 to FIG. 46 is described above for example, the present invention is not limited thereto. That is, the present invention also equally applies to a case where timing is aligned between the backhaul link subframe and the macro link subframe.

Figure 47:
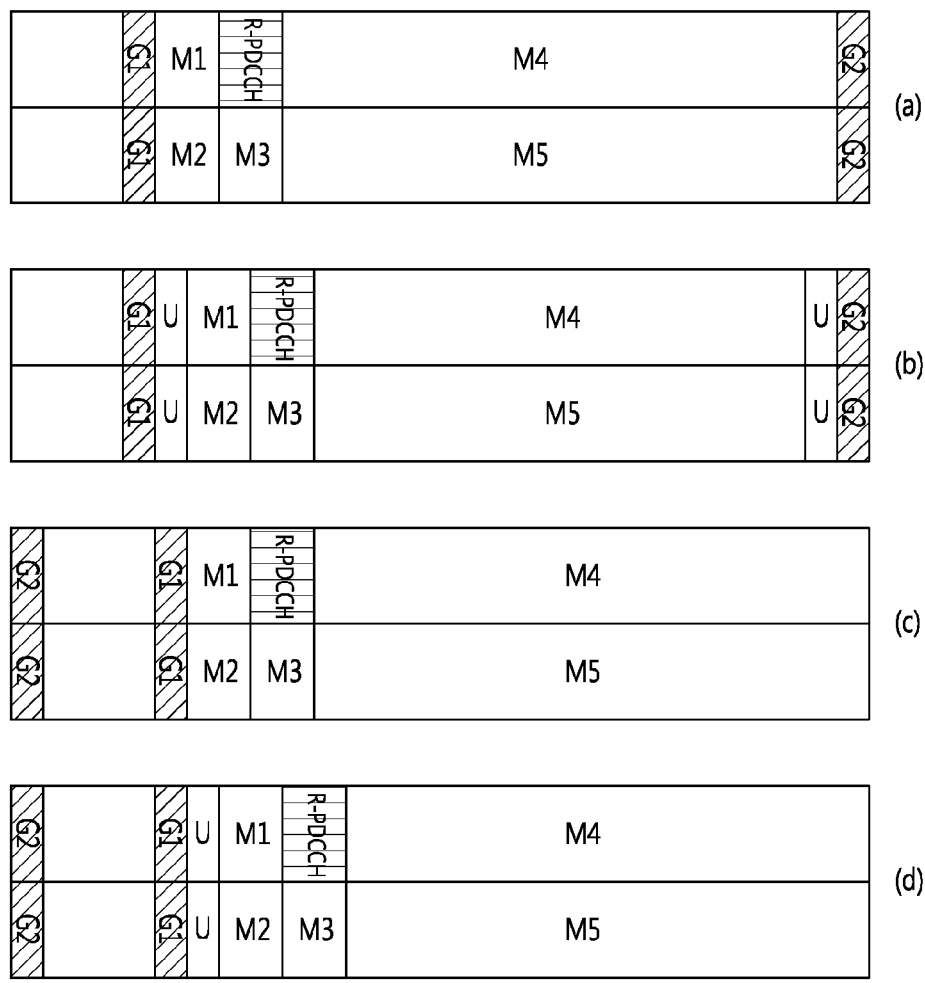
FIG. 47 and FIG. 48 show examples of a multiplexing method of a backhaul link subframe including an R-PDCCH region.
Figure 48:
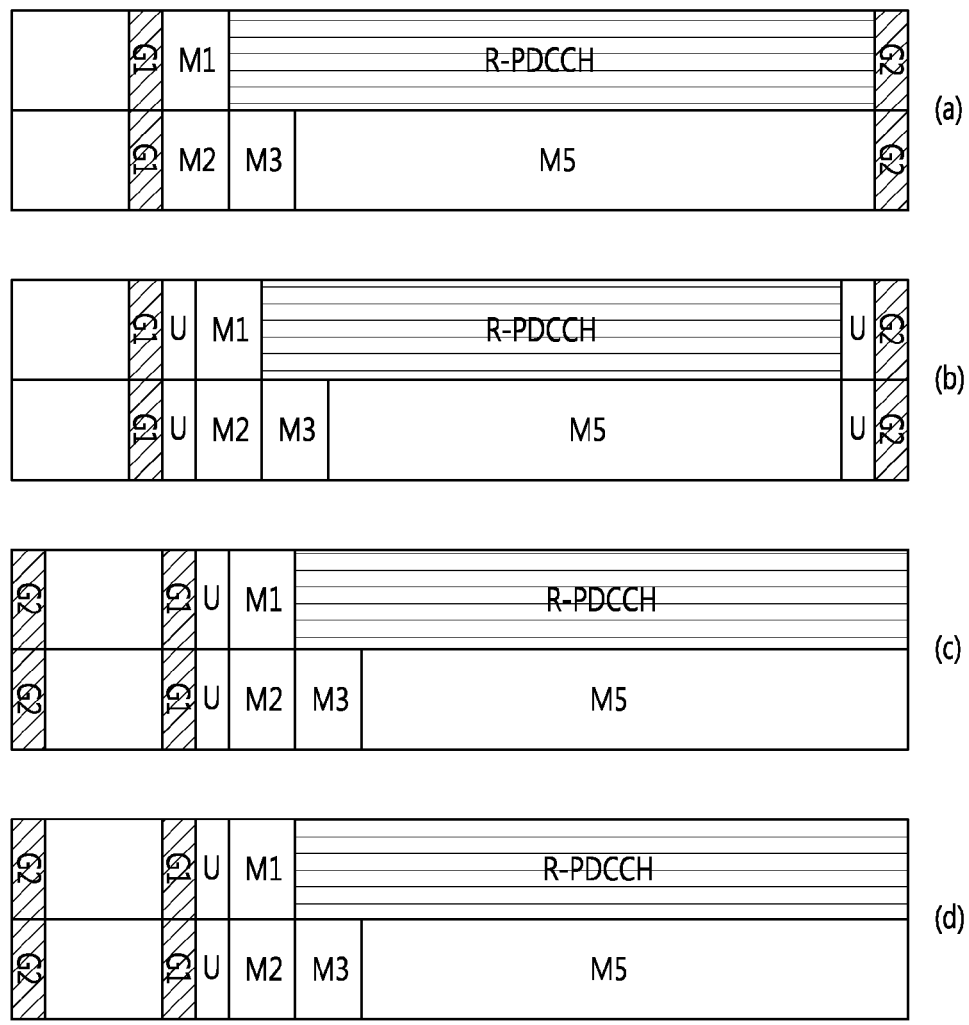

FIG. 47 and FIG. 48 show examples of a multiplexing method of a backhaul link subframe including an R-PDCCH region.

As shown in FIG. 47A to FIG. 47D, in a frequency band including the R-PDCCH region, the PDCCH region and an R-PDSCH region can be subjected to time division multiplexing (TDM). In addition, in a frequency band allocated to one RN, the R-PDCCH region can be limited to some frequency bands. As shown in FIG. 48A to FIG. 48D, the R-PDCCH region and an R-PDSCH region can be subjected to frequency division multiplexing (FDM). That is, a frequency band to which R-PDCCH is allocated and a frequency band to which R-PDSCH is allocated can be set differently. The R-PDCCH region can be allocated across first and second slots of a subframe. In this case, a B-DL grant can be transmitted in an R-PDCCH region included in the first slot, and a B-UL grant can be transmitted in an R-PDCCH region included in the second slot.

In each of various subframe multiplexing methods described with reference to FIG. 47 and FIG. 48, resource mapping can be performed on regions M1 to M5 according to a resource mapping order of {M1, M4, M2, M3, M5}, {M1, M2, M3, M4, M5}. Frequency-first mapping or time-first mapping can apply in each region. When frequency-first mapping applies, mapping can be contiguously performed in a region {M1, M2}, a region {R-PDCCH region, M3}, and a region {M4, M5} without distinction of resource blocks. When time-first mapping applies, mapping can be continuously performed in a region {M1, R-PDCCH region, M4} and a region {M2, M3, M5} without distinction of a symbol or a slot. Regarding resource mapping on the regions M3, M4, and M5, the resource mapping method described with reference to FIG. 23 to FIG. 46 can apply.

A guard time may not be included in FIG. 47 and FIG. 48. In the guard time, resource mapping may not be performed, or rate matching may be performed, or resource mapping may be performed, followed by puncturing. Also in the R-PDCCH region, resource mapping may not be performed, or rate matching may be performed, or resource mapping may be performed, followed by puncturing.

Figure 49:
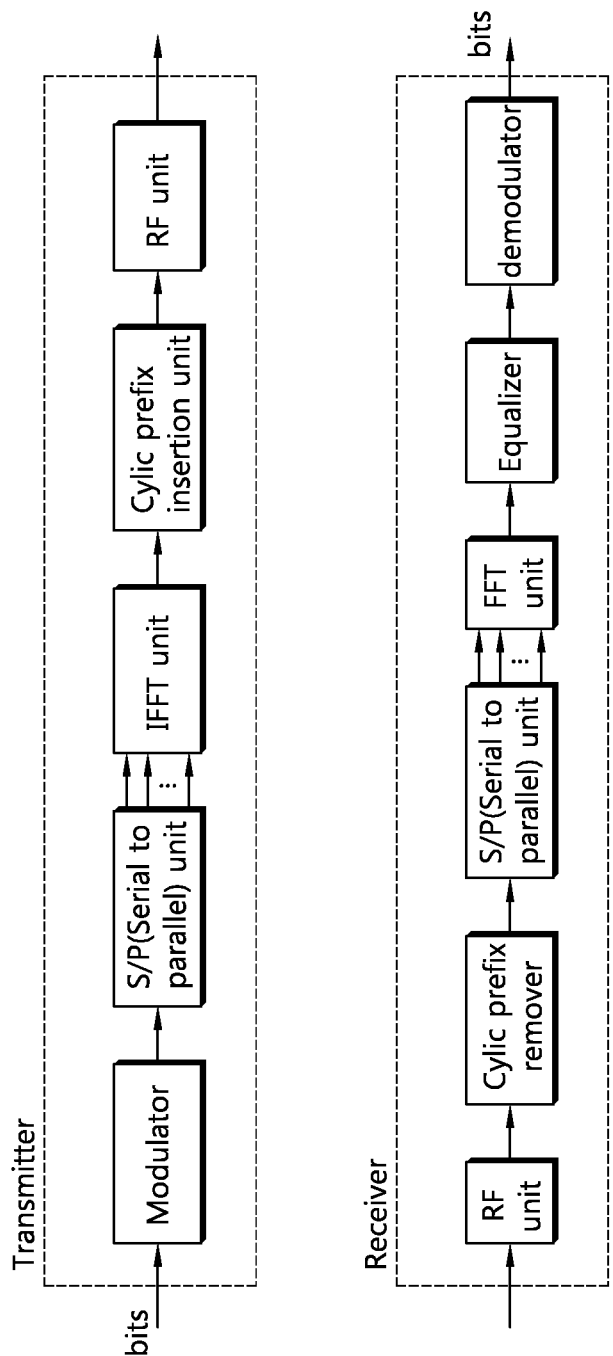
FIG. 49 shows exemplary structures of an orthogonal frequency division multiplexing (OFDM) transmitter and an OFDM receiver.

FIG. 49 shows exemplary structures of an OFDM transmitter and an OFDM receiver. The OFDM transmitter may be a part of a BS, and the OFDM receiver may be a part of an RN.

The OFDM transmitter modulates to-be-transmitted information bits by using a modulator, and thereafter inputs the modulated information bits to a serial to parallel (S/P) unit that converts a serial signal into a parallel signal. The modulator can use various modulation schemes such as quadrature phase shift keying (QPSK), m-quadrature amplitude modulation (QAM), etc. The parallel signal converted by the S/P unit becomes a signal having a period longer than that of channel delay spread. The parallel signal is input to an inverse fast Fourier transform (IFFT) unit that expresses a frequency-domain signal in the form of a time-domain signal. Thereafter, the parallel signal is subjected to IFFT and CP insertion, and is then transmitted through a radio frequency (RF) unit. The RF unit includes at least one antenna.

The OFDM receiver receives a radio signal by using an RF unit, removes a CP by using a CP remover, and then converts a serial signal into a parallel signal by using an S/P unit. The converted parallel signal is subjected to FFT by using an FFT unit. The FFT expresses a time-domain signal in the form of a frequency-domain signal. The frequency-domain signal is restored to data via an equalizer and a demodulator. The equalizer multiplies each subcarrier by an estimated channel response to cancel a channel influence acting on each subcarrier. The demodulator demodulates data according to a demodulation scheme corresponding to the modulation scheme used in the modulator.

Figure 50:
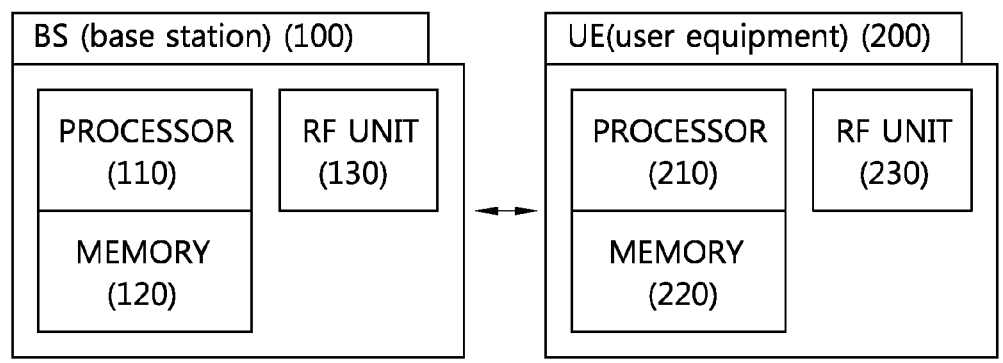
FIG. 50 is a block diagram showing a base station and a relay node.

FIG. 50 is a block diagram showing a BS and an RN.

A BS 100 includes a processor 110, a memory 120, and an RF unit 130. The processor 110 implements the proposed functions, procedure, and/or methods. That is, the processor 110 generates and transmits backhaul resource allocation information to be transmitted to the RN, and transmit B-DL control information and B-DL data to the RN. In this case, a start position of a symbol in which the B-DL control information is transmitted may be fixed to a specific symbol of a backhaul link subframe or may be determined semi-statically. The backhaul resource allocation information includes information on a radio resource for transmitting the B-DL data.

The memory 120 coupled to the processor 110 stores a variety of information for driving the processor 110. The RF unit 130 coupled to the processor 110 transmits and/or receives a radio signal.

An RN 200 includes a processor 210, a memory 220, and an RF unit 230. The processor 210 receives backhaul resource allocation information from the BS, decodes the backhaul resource allocation information, and receives B-DL control information and B-DL data from the BS. In this case, a start position of a symbol in which the B-DL control information is received may be fixed to a specific symbol of a backhaul link subframe or may be determined semi-statically. Layers of a radio interface protocol can be implemented by the processor 210. The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, and/or a data processing unit. The OFDM transmitter and the OFDM receiver of FIG. 49 can be implemented in the processors 110 and 210. The memories 120 and 220 may include a read-only memory (ROM), a random access memory (RAM), a flash memory, a memory card, a storage medium, and/or other equivalent storage devices. The RF units 130 and 230 may include a base-band circuit for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for signal transmission in a wireless communication system, the method comprising:
    transmitting backhaul resource allocation information by a base station to a relay node;
    decoding the backhaul resource allocation information by the relay node; and
    transmitting backhaul downlink control information and backhaul downlink data by the base station to the relay node,
    wherein a start position of a symbol for transmitting the backhaul downlink control information is fixed to a specific symbol of a backhaul link subframe when a modification signal is not provided by a higher layer signal, or the start position of the symbol for transmitting the backhaul downlink control information is changed over the specific symbol of the backhaul link subframe when the modification signal is provided by the higher layer signal,
    wherein the backhaul resource allocation information includes first information on a radio resource for transmitting the backhaul downlink data,
    wherein the backhaul resource allocation information further includes second information on a symbol at which a radio resource for transmitting the backhaul downlink data starts and third information on a length of the radio resource in a time domain, and
    wherein if the second and third information are not included in the backhaul resource allocation information, the first information on the radio resource for transmitting the backhaul downlink data indicates a symbol contiguously located next to the symbol for transmitting the backhaul downlink control information as a start symbol of a radio resource for transmitting the backhaul downlink data, in a frequency band in which the backhaul downlink control information is transmitted.

2. The method of claim 1, wherein the backhaul resource allocation information is transmitted using the higher layer signal.

3. The method of claim 2, wherein the backhaul resource allocation information is transmitted using a radio resource control (RRC) message.

4. The method of claim 1, wherein the start position of the symbol for transmitting the backhaul downlink control information is any one of 3rd, 4th, and 5th symbols in the backhaul link subframe.

5. The method of claim 1, wherein if the specific symbol is the 4th symbol of the backhaul link subframe, the start symbol of the radio resource for transmitting the backhaul downlink data is the 5th symbol of the backhaul link subframe.

6. The method of claim 1, wherein a radio resource region in which the backhaul downlink control information is transmitted includes one or more symbols in a time domain.

7. The method of claim 6, wherein when the radio resource region in which the backhaul downlink control information is transmitted includes a symbol located in a first slot of a backhaul link subframe and a symbol located in a second slot, a backhaul downlink grant is transmitted in the symbol located in the first slot, and a backhaul uplink grant is transmitted in the symbol located in the second slot.

8. A relay node comprising:

a radio frequency (RF) unit configured to transmit and receive a radio signal; and a processor coupled to the RF unit, wherein the processor is configured to receive backhaul resource allocation information from a base station, decode the backhaul resource allocation information, and receive backhaul downlink control information and backhaul downlink data from the base station, wherein a start position of a symbol for transmitting the backhaul downlink control information is fixed to a specific symbol of a backhaul link subframe when a modification signal is not provided by a higher layer signal, or the start position of the symbol for transmitting the backhaul downlink control information is changed over the specific symbol of the backhaul link subframe when the modification signal is provided by the higher layer signal, wherein the backhaul resource allocation information includes first information on a radio resource for transmitting the backhaul downlink data, wherein the backhaul resource allocation information further includes second information on a symbol at which a radio resource for transmitting the backhaul downlink data starts and third information on a length of the radio resource in a time domain, and wherein if the second and third information are not included in the backhaul resource allocation information, the first information on the radio resource for transmitting the backhaul downlink data indicates a symbol contiguously located next to the symbol for transmitting the backhaul downlink control information as a start symbol of a radio resource for transmitting the backhaul downlink data, in a frequency band in which the backhaul downlink control information is transmitted.

* * * * *